(12) United States Patent
Saka

(10) Patent No.: US 9,398,191 B2
(45) Date of Patent: Jul. 19, 2016

(54) ELECTRONIC DOCUMENT GENERATION SYSTEM, ELECTRONIC DOCUMENT GENERATION APPARATUS, AND RECORDING MEDIUM

(71) Applicant: Konica Minolta, Inc., Chiyoda-ku, Tokyo (JP)

(72) Inventor: Masaaki Saka, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/797,748

(22) Filed: Jul. 13, 2015

(65) Prior Publication Data

US 2016/0014299 A1    Jan. 14, 2016

(30) Foreign Application Priority Data

Jul. 11, 2014 (JP) ................. 2014-143600

(51) Int. Cl.

| | |
|---|---|
| G06F 15/00 | (2006.01) |
| G06K 1/00 | (2006.01) |
| G06K 15/02 | (2006.01) |
| H04N 1/387 | (2006.01) |
| H04N 1/00 | (2006.01) |
| G06K 9/00 | (2006.01) |
| G06K 9/20 | (2006.01) |

(52) U.S. Cl.
CPC .......... *H04N 1/3872* (2013.01); *G06K 9/00469* (2013.01); *G06K 9/2054* (2013.01); *H04N 1/00244* (2013.01); *H04N 2201/0094* (2013.01)

(58) Field of Classification Search
USPC .................................. 358/1.1–1.18
See application file for complete search history.

(56) References Cited

U.S. PATENT DOCUMENTS

| | | | | |
|---|---|---|---|---|
| 8,923,618 B2* | 12/2014 | Kutsumi | .................. | G06K 9/03 382/176 |
| 8,934,147 B2* | 1/2015 | Shimazu | ............... | G06F 17/217 358/403 |
| 9,143,638 B2* | 9/2015 | King | ................. | G06F 17/30265 |

FOREIGN PATENT DOCUMENTS

| | | |
|---|---|---|
| JP | 2009223363 A | 10/2009 |
| JP | 2012022571 A | 2/2012 |
| JP | 2012073749 A | 4/2012 |

* cited by examiner

*Primary Examiner* — Douglas Tran
(74) *Attorney, Agent, or Firm* — Cantor Colburn LLP

(57) ABSTRACT

An electronic document generation apparatus extracts a processing target area including a row area from a scanned image of an original document and detects the dimensions of the row area, the row area being an area of either a whole or partial range of a row of character string arranged in one direction in the scanned image. The apparatus determines an arrangement-direction character size on the basis of the dimensions of the row area, and sends out image data of the processing target area and an instruction to perform OCR processing on the processing target area to an external apparatus. The apparatus then receives a processing result of the OCR processing from the external apparatus, and arranges a character string of the processing result in the electronic document on the basis of the arrangement-direction character size to generate an electronic document.

30 Claims, 19 Drawing Sheets

Fig.8

| No. | TOP | BOTTOM | LEFT | RIGHT | NUMBER OF CHARACTERS |
|---|---|---|---|---|---|
| 1 | 100 | 200 | 400 | 1600 | 31 |
| 2 | 220 | 320 | 400 | 1100 | 20 |
| 3 | 400 | 470 | 400 | 1400 | 38 |

| No. | H(HEIGHT) | W(WIDTH) |
|---|---|---|
| 1 | 100 | 1200 |
| 2 | 100 | 700 |
| 3 | 70 | 1000 |

ABCDE Wireless Digital Radiography System Specifications     230

ABCDE system 14x17 inch/17X17 inch detector

250

ABCDE Wireless Digital Radiography

System Specifications

ABCDE system 14x17 inch/17X17 inch detector

Fig. 11

ABCDE Wireless Digital Radiography
System Specifications

ABCDE system 14x17 inch/17X17 inch detector

Fig. 12

ABCDE Wireless Digital Radiography
System Specifications

ABCDE system 14x17 inch/17X17 inch detector

Fig.17

ABCDE Wireless Digital Radiography
System Specifications

14x17 inch        17x17 inch

Fig.18

ABCDE Wireless Digital Radiography
System Specifications

14x17 inch   17x17   17x17 inch

ELECTRONIC DOCUMENT GENERATION SYSTEM, ELECTRONIC DOCUMENT GENERATION APPARATUS, AND RECORDING MEDIUM

CROSS REFERENCE TO RELATED APPLICATIONS

The present invention claims priority under 35 U.S.C. §119 to Japanese Application No. 2014-143600 filed on Jul. 11, 2014, the entire content of which is incorporated herein by reference.

BACKGROUND OF INVENTION

1. Technical Field

The present invention relates to an electronic document generation system for generating an electronic document and a technique related thereto.

2. Background Art

Techniques for scanning an original document to generate an electronic document are known for use in an image forming apparatus such as a Multi-Functional Peripheral (MFP).

Examples of the techniques include a technique for generating an electronic document with text data, which will be described below (see JP 2012-73749A, for example), in addition to a technique for directly obtaining a scanned image of an original document to generate an electronic document. More specifically, a scanned image (in particular, an image representing characters) of an original document is subjected to optical character recognition processing (hereinafter, also referred to as "OCR processing") so that text data of characters in the scanned image is automatically recognized and overlaid with and embedded in the scanned image without being displayed. This produces an electronic document in a predetermined format (electronic document with text data) known as a PDF (portable document format) document (or searchable PDF document) with invisible text, for example.

Incidentally, there are techniques for using a cloud server to provide services related to various types of application software. As one example of such cloud services (application services), there is known to be a technique for providing general-purpose OCR processing services. However, the general-purpose OCR processing services provide only fundamental functions (only OCR processing) and do not generate an electronic document with text data. Thus, final processing for generating an electronic document with text data needs to be performed on the client device side.

In the case of using a general-purpose OCR processing service, for example, a scanned image is first transmitted from a client device (specifically, an application that is being executed by the client device) to a cloud server (specifically, another application that is being executed by the cloud server). Then, the cloud server executes OCR processing on the entire scanned image and returns the result of the processing to the client device. The client device embeds the OCR processing result received from the cloud server into the original scanned image to generate an electronic document with text data (e.g., a searchable PDF document (PDF document with invisible text)). Using such a general-purpose OCR processing service allows the OCR processing to be performed by the other device (cloud server) different from the client device (e.g., an image forming apparatus or an apparatus for generating a scanned image) that has requested the execution of the OCR processing. It is thus possible to reduce the processing load on the client device.

However, in the case where the client device gives an instruction to perform OCR processing on the scanned image to the other device (cloud server) and uses the OCR processing result to generate an electronic document with text data as mentioned above, a problem may occur in which a character image in the scanned image and text data are shifted from each other when arranged. For example, when a character string of the OCR processing result (text data) and a character string (character string serving as a character image) of the scanned image have different character sizes and are arranged in the same page, the character string of the OCR processing result is arranged at a quite different position in the direction of arrangement from the character string serving as the character image in the scanned image. To be more specific, although the two character strings may be at first arranged at the same position, the amount of shift in position between these character strings will become evident especially at the ends of the character strings in the arrangement direction.

Such a problem occurs due to the fact that the cloud server returns only the OCR processing result (the result of character string recognition) to the client device and does not return the sizes of recognized characters. This problem can become evident in particular when the application on the cloud server side takes a substantially fixed form of outputting processing results (e.g., when it is not possible for an electronic document generation application on the client side to arbitrarily set its output form).

SUMMARY OF INVENTION

It is an object of the present invention to provide a technique for arranging character strings of OCR processing results at relatively accurate positions in the direction of arrangement of the character strings in a technique in which a request for OCR processing is issued from one apparatus to another apparatus, and a result of the processing is used to generate an electronic document.

According to a first aspect of the present invention, the electronic document generation system includes a first apparatus configured to generate an electronic document on the basis of a scanned image of an original document, and a second apparatus configured to execute optical character recognition processing on the scanned image upon a request received from the first apparatus and send out a processing result of the optical character recognition processing to the first apparatus. The first apparatus includes an extraction unit configured to extract a processing target area from the scanned image, the processing target area including a row area that is an area of a whole or partial range of a row of character string arranged in one direction in the scanned image, a detection unit configured to detect dimensions of the row area, a determination unit configured to determine an arrangement-direction character size on the basis of the dimensions of the row area, the arrangement-direction character size being a character size of characters in the processing target area and being a character size in an arrangement direction of the row of character string, an instruction sending unit configured to send out image data of the processing target area and an instruction to perform the optical character recognition processing on the processing target area to the second apparatus, a reception unit configured to receive a processing result of the optical character recognition processing performed on the processing target area from the second apparatus, and a generation unit configured to generate the electronic document by arranging a character string of the processing result in the electronic document on the basis of the arrangement-direction character size determined by the determination unit.

According to a second aspect of the present invention, an electric document generation apparatus for generating an electronic document on the basis of a scanned image of an original document includes an extraction unit configured to extract a processing target area from the scanned image, the processing target area including a row area that is an area of a whole or partial range of a row of character string arranged in one direction in the scanned image, a detection unit configured to detect dimensions of the row area, a determination unit configured to determine an arrangement-direction character size on the basis of the dimensions of the row area, the arrangement-direction character size being a character size of characters in the processing target area and being a character size in an arrangement direction of the row of character string, an instruction sending unit configured to send out image data of the processing target area and an instruction to perform optical character recognition processing on the processing target area to an external apparatus, a reception unit configured to receive a processing result of the optical character recognition processing executed on the processing target area by the external apparatus, from the external apparatus, and a generation unit configured to generate the electronic document by arranging a character string of the processing result in the electronic document on the basis of the arrangement-direction character size determined by the determination unit.

According to a third aspect of the present invention, a non-transitory computer-readable recording medium that stores a program for causing a computer that is built into an electric document generation apparatus for generating an electronic document on the basis of a scanned image of an original document, to execute the steps of a) extracting a processing target area from the scanned image, the processing target area including a row area that is an area of a whole or partial range of a row of character string arranged in one direction in the scanned image, b) detecting dimensions of the row area, c) determining an arrangement-direction character size on the basis of the dimensions of the row area, the arrangement-direction character size being a character size of characters in the processing target area and being a character size in an arrangement direction of the row of character string, d) sending out image data of the processing target area and an instruction to perform optical character recognition processing on the processing target area to an external apparatus, e) receiving a processing result of the optical character recognition processing executed on the processing target area by the external apparatus from the external apparatus, and f) arranging a character string of the processing result in the electronic document on the basis of the arrangement-direction character size determined in the step c).

According to a fourth aspect of the present invention, an electric document generation apparatus for generating an electronic document on the basis of a scanned image of an original document includes an extraction unit configured to extract a processing target area that includes a plurality of rows of character string from the scanned image, a detection unit configured to detect dimensions of the processing target area, a determination unit configured to determine an arrangement-direction character size on the basis of the dimensions of the processing target area, the arrangement-direction character size being a character size of characters in the processing target area and being a character size in an arrangement direction of the character string in the processing target area, an instruction sending unit configured to send out image data of the processing target area and an instruction to perform optical character recognition processing on the processing target area to an external apparatus, a reception unit configured to receive a processing result of the optical character recognition processing executed on the processing target area by the external apparatus from the external apparatus, and a generation unit configured to generate the electronic document by arranging a character string of the processing result in the electronic document on the basis of the arrangement-direction character size determined by the determination unit. The determination unit is configured to determine an orthogonal-direction character size on the basis of a length of the processing target area in an orthogonal direction orthogonal to the arrangement direction and the number of rows of character string included in the processing target area, and determine the arrangement-direction character size on the basis of the orthogonal-direction character size, the orthogonal-direction character size being a character size of characters in the processing target area and being a character size in the orthogonal direction.

According to a fifth aspect of the present invention, a non-transitory computer-readable recording medium that stores a program for causing a computer that is built into an electric document generation apparatus for generating an electronic document on the basis of a scanned image of an original document, to execute the steps of a) extracting a processing target area that includes a plurality of rows of character string from the scanned image, b) detecting dimensions of the processing target area, c) determining an arrangement-direction character size on the basis of the dimensions of the processing target area, the arrangement-direction character size being a character size of characters in the processing target area and being a character size in an arrangement direction of the character string in the processing target area, d) sending out image data of the processing target area and an instruction to perform optical character recognition processing on the processing target area to an external apparatus, e) receiving a processing result of the optical character recognition processing executed on the processing target area by the external apparatus from the external apparatus, and f) arranging the character string of the processing result in the electronic document on the basis of the arrangement-direction character size determined in the step c). The step c) includes the steps of c-1) determining an orthogonal-direction character size on the basis of a length of the processing target area in an orthogonal direction orthogonal to the arrangement direction and the number of rows of character string included in the processing target area, the orthogonal-direction character size being a character size of characters in the processing target area and being a character size in the orthogonal direction, and c-2) determining the arrangement-direction character size on the basis of the orthogonal-direction character size.

These and other objects, features, aspects and advantages of the present invention will become more apparent from the following detailed description of the present invention when taken in conjunction with the accompanying drawings.

BRIEF DESCRIPTION OF DRAWINGS

FIG. 8 illustrates information such as position information of each partial area.

FIG. 11 illustrates a result of character arrangement according to a first embodiment.

FIG. 12 illustrates a result of character arrangement according to a comparative example.

FIG. 17 illustrates a result of character arrangement according to a fifth embodiment.

FIG. 18 illustrates a result of character arrangement according to another comparative example.

DETAILED DESCRIPTION OF PREFERRED EMBODIMENTS

Hereinbelow, embodiments of the present invention will be described with reference to the accompanying drawings.

1. First Embodiment

1.1 Overview of Configuration

Figure 1:
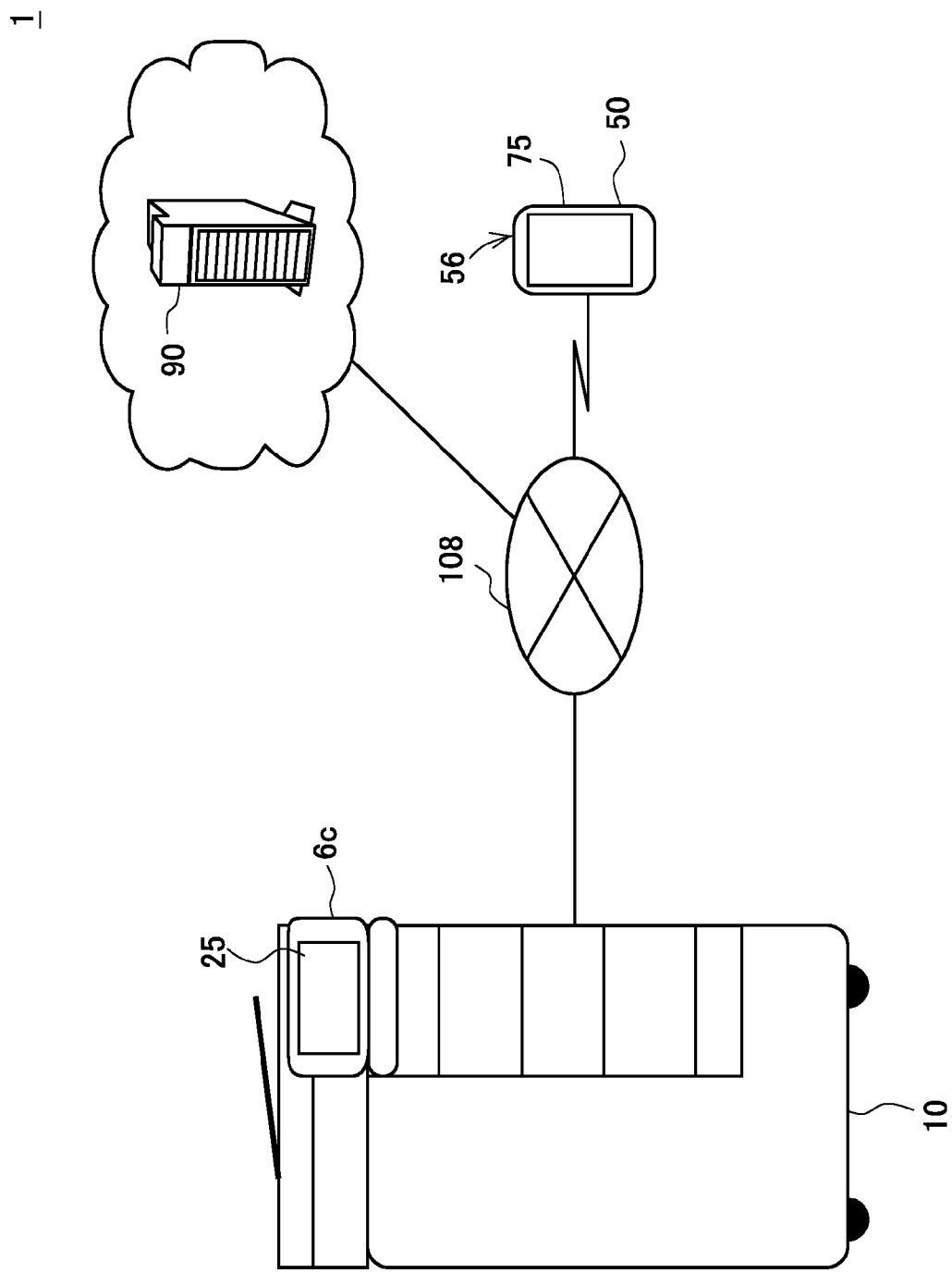
FIG. 1 illustrates an image forming system (electronic document generation system).

FIG. 1 illustrates an image forming system 1 according to the present invention. As illustrated in FIG. 1, the image forming system 1 includes an image forming apparatus 10, an external terminal 50, and a cloud server 90.

The image forming apparatus 10, the external terminal 50, and the cloud server 90 are connected to one another via a network (communication network) 108. The network 108 is, for example, a local area network (LAN) or the Internet. The connection to the network 108 may be either wired or wireless connection. For example, the image forming apparatus 10 and the cloud server 90 are wire-connected to the network 108, and the external terminal 50 is wirelessly connected to the network 108.

The cloud server 90 is an external apparatus (external server) that is different from the image forming apparatus 10 and the external terminal 50. The cloud server 90 has an application 120 (here, a general-purpose optical character recognition (OCR) application) installed therein. The cloud server 90 is a server that provides a general-purpose OCR processing service, using the application 120. This cloud server 90 (application 120), however, does not provide a service for generating a searchable PDF (portable document format) document. A searchable PDF document is generated by, for example, the external terminal 50 and the cloud server 90 coordinating with each other, as will be described later.

In the image forming system 1, the image forming apparatus 10 generates a scanned image 200 (see FIG. 4, for example) of an original document and transmits the scanned image 200 to the external terminal 50. The external terminal 50 generates an electronic document 500 (see FIG. 4, for example) on the basis of the scanned image 200 received from the image forming apparatus 10. The operation of generating the electronic document 500 is implemented by, for example, executing an electronic document generation application 110 (see FIG. 4, for example) installed in the external terminal 50.

The electronic document generation application 110 extracts a plurality of partial areas 230 from the scanned image 200. The partial areas 230 are then each subjected to OCR processing, using a OCR processing service that is provided by the application 120 of the cloud server 90. Each partial area 230 is an area to be subjected to OCR processing and is also referred to as a "processing target area." The OCR processing performed by the server 90 is requested by the external terminal 50 for each partial area 230. In other words, each partial area 230 is an area that forms a request unit (processing unit) for the OCR processing performed by the server, and is also referred to as a "processing unit area."

The electronic document generation application 110 receives a result (text data) of processing performed on each partial area 230 from the general-purpose application 120 and generates an electronic document 500 on the basis of the received processing result. The electronic document 500 is generated in the form of an electronic document with text data (here, a searchable PDF document).

Note that the image forming system 1, which is a system for generating an electronic document, is also referred to as an "electronic document generation system," for example. Similarly, the external terminal 50 is also referred to as an "electric document generation apparatus."

1-2. Configuration of Image Forming Apparatus

Figure 2:
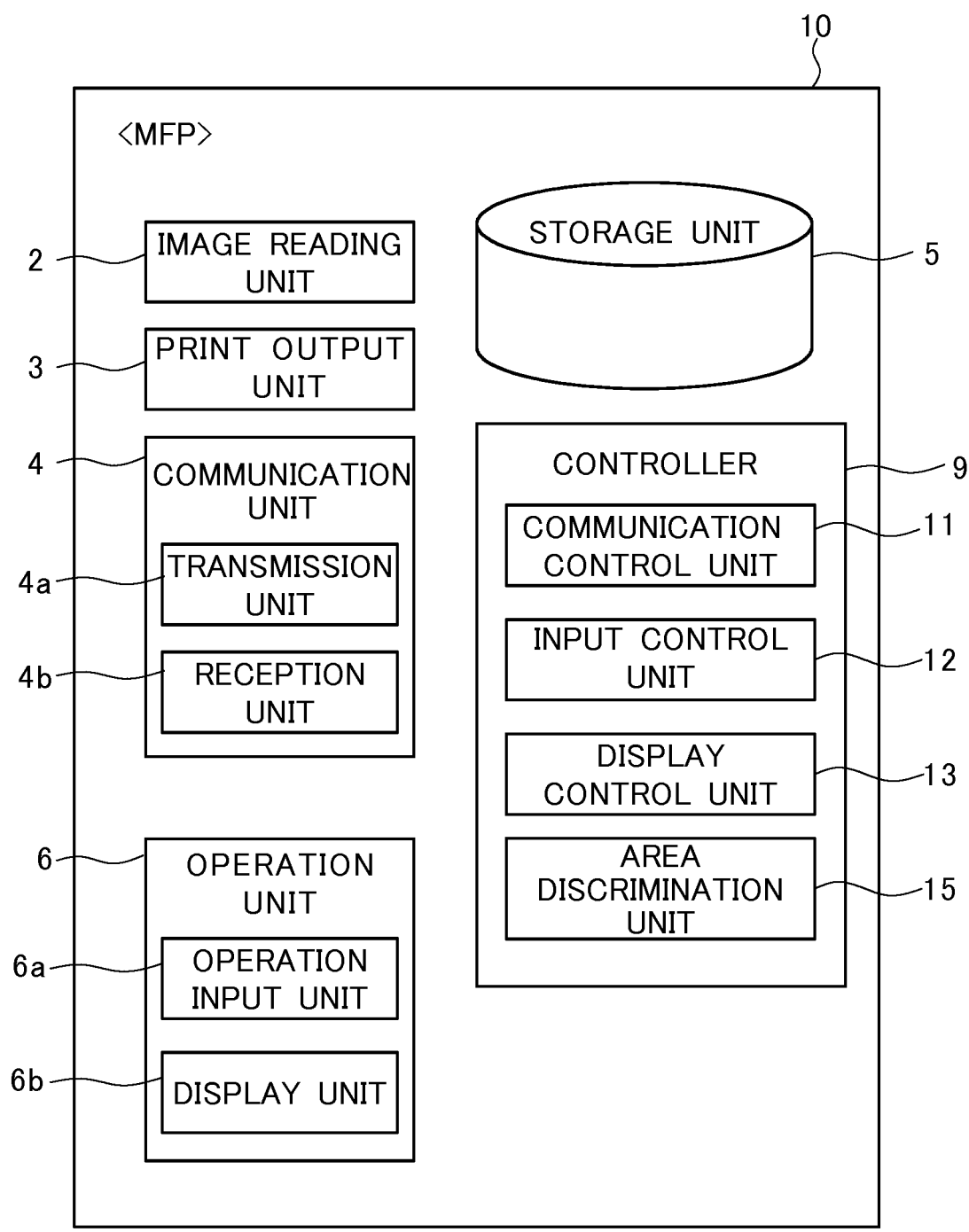
FIG. 2 is a functional block diagram of an image forming apparatus.

FIG. 2 is a functional block diagram of the image forming apparatus 10. Here, a Multi-Functional Peripheral (MFP) is illustrated as an example of the image forming apparatus 10. FIG. 2 illustrates functional blocks of the MFP 10.

The MFP 10 is an apparatus (also, referred to as a "Multi-Functional Peripheral") having functions such as a scan function, a copy function, a facsimile function, and a box storage function. More specifically, the MFP 10 includes, for example, an image reading unit 2, a print output unit 3, a communication unit 4, a storage unit 5, an operation unit 6, and a controller 9 as illustrated in the functional block diagram of FIG. 2, and achieves various types of functions by operating these units in combination.

The image reading unit 2 is a processing unit configured to optically read (i.e., scan) an original document placed at a predetermined position on the MFP 10 to generate image data (also referred to as an "original image" or a "scanned image") of the original document. The image reading unit 2 is also referred to as a "scanning unit."

The print output unit 3 is an output unit configured to print out an image on various types of media, such as paper, on the basis of data regarding an object to be printed.

The communication unit 4 is a processing unit capable of facsimile communication via a public network, for example. The communication unit 4 is also capable of network communication via the network 108. In the network communication, various types of protocols such as TCP/IP (Transmission Control Protocol/Internet Protocol) are used. Using the network communication enables the MFP 10 to exchange various types of data with desired destinations (e.g., the external terminal 50). The communication unit 4 includes a transmission unit 4a configured to transmit various types of data and a reception unit 4b configured to receive various types of data.

The storage unit 5 is a storage device such as a hard disk drive (HDD).

The operation unit 6 includes an operation input unit 6a configured to receive input of operation to the MFP 10, and a display unit 6b configured to display and output various types of information.

The MFP 10 is also provided with a generally plate-like operation panel unit 6c (see FIG. 1). The operation panel unit 6c includes a touch panel 25 (see FIG. 1) on the front side. The touch panel 25 functions as not only part of the operation input unit 6a but also part of the display unit 6b. The touch panel 25 is configured by embedding various types of sensors or the like in a liquid crystal display panel and is capable of displaying various types of information and receiving various types of operation input from an operator.

For example, the touch panel 25 displays various types of operation screens (e.g., a menu screen), which includes images of buttons, for example. By pressing buttons that are virtually arranged in operation screens of the touch panel 25, the operator can set details of various types of operations to be performed by the MFP 10 and can give operational instructions.

The controller 9 is a control device that is built into the MFP 10 and configured to perform overall control of the MFP 10. The controller 9 is configured as a computer system that includes a CPU and various types of semiconductor memories (RAM and ROM), for example. The controller 9 implements various types of processing units by causing the CPU to execute a predetermined software program (hereinafter, also simply referred to as a "program") stored in a ROM (e.g., EEPROM). Note that the program (specifically, a group of program modules) may be recorded in a portable recording medium (or in other words, any of various types of non-transitory computer-readable recording media) such as a USB memory, read out from the recording medium, and installed into the MFP 10. Alternatively, the program may be downloaded via the network 108 or the like and installed into the MFP 10.

More specifically, the controller 9 executes the program to implement various types of processing units including a communication control unit 11, an input control unit 12, a display control unit 13, and an area discrimination unit 15, as illustrated in FIG. 2.

The communication control unit 11 is a processing unit configured to control an operation of communication with another apparatus (e.g., the external terminal 50) in cooperation with, for example, the communication unit 4. For example, the communication control unit 11 transmits a scanned image or the like to the external terminal 50.

The input control unit 12 is a control unit configured to control operation input to the operation input unit 6a (e.g., the touch panel 25). For example, the input control unit 12 controls an operation of receiving operation input to the operation screen displayed on the touch panel 25.

The display control unit 13 is a processing unit configured to control a display operation of the display unit 6b (e.g., the touch panel 25). For example, the display control unit 13 causes the touch panel 25 to display an operation screen for operating the MFP 10.

Figure 4:
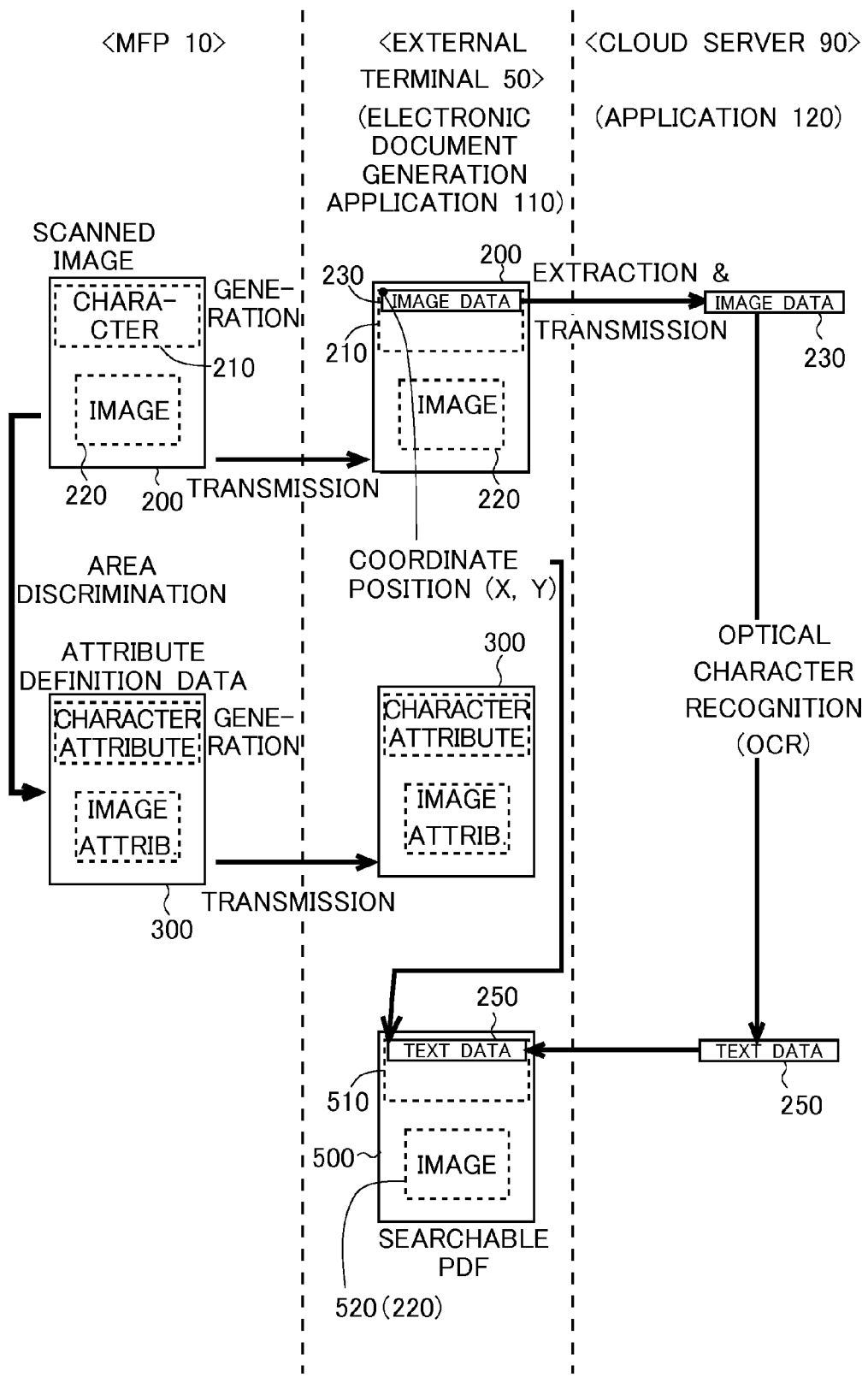
FIG. 4 illustrates an overview of operations performed in the electronic document generation system.

The area discrimination unit 15 is a processing unit configured to discriminate areas (area types) in the scanned image 200 (see FIG. 4). For example, the area discrimination unit 15 makes a distinction and discrimination between a character area 210 and a non-character area (e.g., a graphics area) in the scanned image 200.

1-3. Configuration of External Terminal

Next is a description of the configuration of the external terminal 50.

The external terminal 50 is an information input/output terminal device (also referred to as a "communication device") capable of network communication with the MFP 10 and the cloud server 90. Here, a tablet terminal is illustrated as an example of the external terminal 50. The form of the external terminal 50 is, however, not limited to this example, and the external terminal 50 may be other devices such as a smartphone or a personal computer. The external terminal may be either a portable device (e.g., a personal digital assistant or a mobile terminal) or a stationary device.

Figure 3:
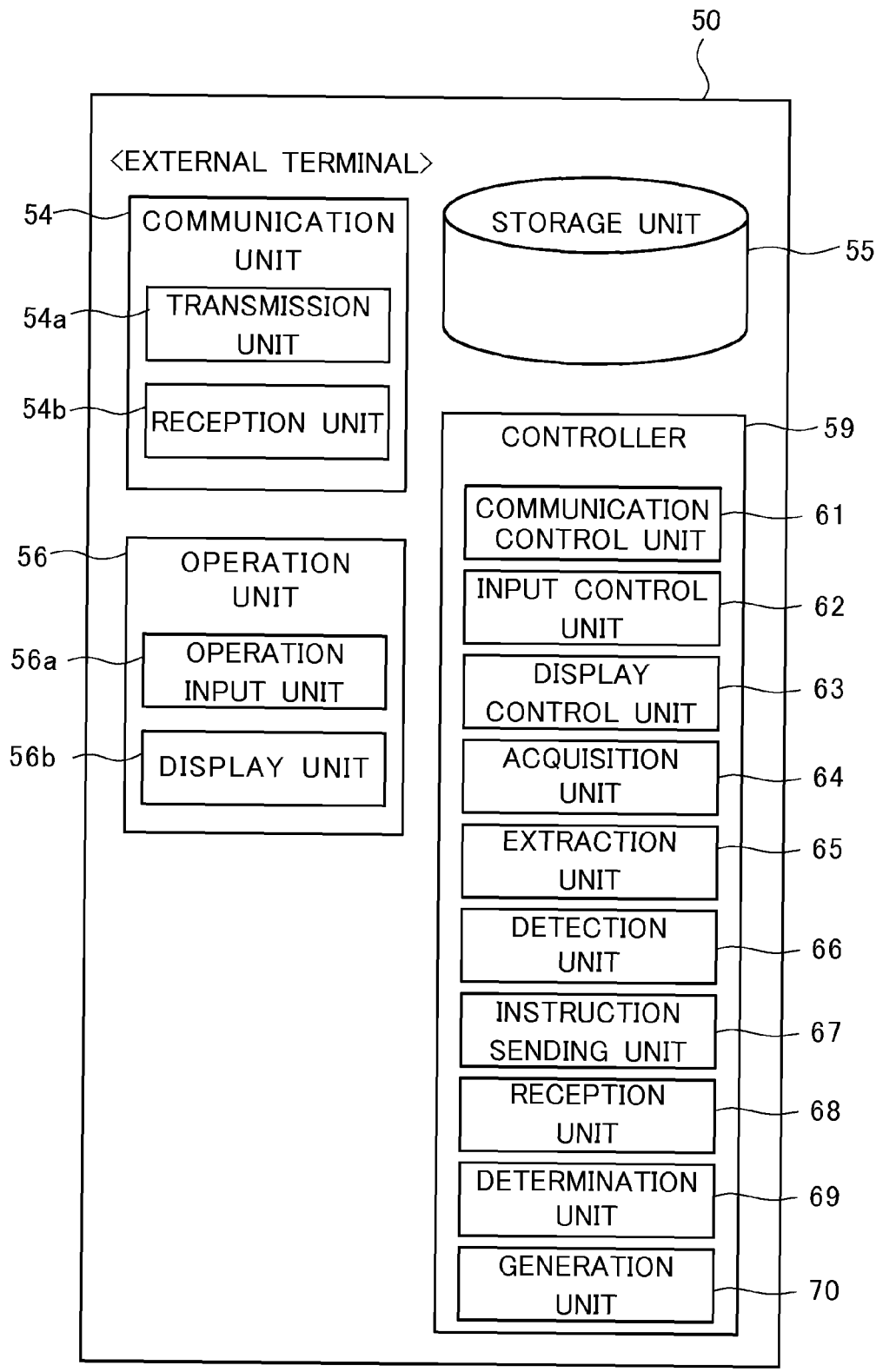
FIG. 3 is a functional block diagram of a schematic configuration of an external terminal.

FIG. 3 is a functional block diagram illustrating a schematic configuration of the external terminal 50.

As illustrated in the functional block diagram of FIG. 3, the external terminal 50 includes, for example, a communication unit 54, a storage unit 55, an operation unit 56, and a controller 59 and implements various types of functions by operating these units in combination.

The communication unit 54 is capable of network communication via the network 108. In the network communication, various types of protocols such as TCP/IP (Transmission Control Protocol/Internet Protocol) are used. Using the network communication allows the external terminal 50 to exchange various types of data with desired destinations (e.g., the MFP 10 and the cloud server 90). The communication unit 54 includes a transmission unit 54a configured to transmit various types of data and a reception unit 54b configured to receive various types of data. For example, the reception unit 54b receives the scanned image 200 from the image forming apparatus 10, and the transmission unit 54a transmits image data of a plurality of partial areas 230 (see FIG. 4) in the scanned image 200 to the cloud server 90. The reception unit 54b also receives, for example, the results of OCR processing performed on the plurality of partial areas 230 from the cloud server 90.

The storage unit 55 is a storage device such as a nonvolatile semiconductor memory and stores various types of information.

The operation unit 56 includes an operation input unit 56a configured to receive operation input to the external terminal 50, and a display unit 56b configured to display and output various types of information. The external terminal 50 is also provided with a touch panel 75 (see FIG. 1) that is configured by embedding, for example, various types of sensors in a liquid crystal display panel. More specifically, as illustrated in FIG. 1, the touch panel 75 is provided on substantially the entire surface, excluding a periphery portion (frame portion), on the front side of the generally plate-like external terminal 50. The touch panel 75 functions as a user interface. In other words, the touch panel 75 functions as not only part of the operation input unit 56a but also part of the display unit 56b.

The controller 59 in FIG. 3 is a control device that is built into the external terminal 50 and configured to perform overall control of the external terminal 50. The controller 59 is configured as a computer system that includes a CPU and various types of semiconductor memories (RAM and ROM), for example. The controller 59 implements various types of processing units by causing the CPU to execute a predetermined software program (hereinafter, also simply referred to as a "program") stored in a storage unit (e.g., a semiconductor memory). Note that this program (specifically, a group of program modules) may be recorded in a portable recording medium (or in other words, any of various types of non-transitory computer-readable recording media) such as a USB memory, read from the recording medium, and installed into the external terminal 50. Alternatively, the program may be downloaded via the network 108 or the like and installed into the external terminal 50.

The external terminal 50 has an application program (also simply referred to as an "application") 110 installed therein to control cooperative processing performed in cooperation with the image forming apparatus 10. By executing the application program 110, the external terminal 50 receives the scanned image generated by the image forming apparatus 10 from the image forming apparatus 10 and uses the scanned image to execute processing for generating an electronic document.

More specifically, the controller 59 executes the application program 110 or the like to implement various types of processing units including a communication control unit 61, an input control unit 62, a display control unit 63, an acquisition unit 64, an extraction unit 65, a detection unit 66, an instruction sending unit 67, a reception unit 68, a determination unit 69, and a generation unit 70.

The communication control unit 61 is a processing unit configured to control an operation of communication with the MFP 10 and the cloud server 90, for example, in cooperation with the communication unit 54, for example.

The input control unit 62 is a control unit configured to control operation input to the operation input unit 56a (e.g., the touch panel 75). For example, the input control unit 62 controls an operation of receiving touch operation input to an operation screen displayed on the touch panel 75.

The display control unit 63 is a processing unit configured to control a display operation of the display unit 56b (e.g., the touch panel 75). For example, the display control unit 63 displays an operation screen for performing cooperative processing with the MFP 10 on the touch panel 75.

Note that the input control unit 62 and the display control unit 63 are also collectively referred to as a "user interface control unit."

The acquisition unit 64 is a processing unit configured to acquire, for example, the scanned image 200 (see FIG. 4) generated by the MFP 10. The acquisition unit 64 receives and acquires the scanned image 200 or the like from the MFP 10 in cooperation with the communication unit 54 and the communication control unit 61, for example.

The extraction unit 65 is a processing unit configured to extract one or a plurality of partial areas 230 (see FIG. 4) from the character area of the scanned image 200. Each partial area 230 is extracted as an area that includes a single row of character string, i.e., a character string area. The character string area is an area of a character string that extends in the row direction, and is also referred to as a "row area." In the present embodiment, each partial area 230 is extracted as an area that includes a character string area (also referred to as a "single row area") that is an area of a single row of character string. The partial areas 230 are, however, not limited to this example, and each partial area 230 may be extracted as an area that includes a plurality of rows of character string. In other words, each partial area 230 may be extracted as an area that includes a plurality of row areas (character string area corresponding to a plurality of rows).

The detection unit 66 is a processing unit configured to detect the position and dimensions of each of a plurality of partial areas 230 in the scanned image 200. The detection unit 66 is also a processing unit configured to execute processing for detecting the dimensions of an area of a single row of character string (row area) included in each partial area 230. Note that when each partial area 230 is an area of a single row of character string (single row area), the processing for obtaining the dimensions of each partial area 230 also corresponds to processing for obtaining the dimensions of the corresponding row area. The detection unit 66 is also configured to detect the number of characters in the row area (partial area 230).

The determination unit 69 is a processing unit configured to determine a character size (an arrangement-direction character size and an orthogonal-direction character size, which will be described below) of characters in each partial area (processing target area) 230. For example, the determination unit 69 determines the "arrangement-direction character size" on the basis of the dimensions of the row area, as will be described later.

The "arrangement-direction character size" refers to a character size of characters (in each partial area (processing target area) 230) in the arrangement direction (specifically, the arrangement direction of character string in the row area of the partial area). In the case of a horizontally written character string, the arrangement direction of the character string is in the left-right direction (the width direction of characters), and the "character width" corresponds to the arrangement-direction character size (character size in the arrangement direction). In the case of a vertically written character string, the arrangement direction of the character string is in the up-down direction (the height direction of characters), and the "height" (character height) corresponds to the arrangement-direction character size.

The "orthogonal-direction character size" refers to a character size of characters (in each partial area (processing target area) 230) in an orthogonal direction (specifically, a direction orthogonal to the arrangement direction of the character string in the row area of the partial area). In the case of a horizontally written character string, the "character height" corresponds to the "orthogonal-direction character size," and in the case of a vertically written character string, the "character width" corresponds to the "orthogonal-direction character size."

The following description is given on the assumption that character strings are primarily written horizontally.

The instruction sending unit 67 is a processing unit configured to cause the application program 110 to send out, for example, an instruction to execute predetermined processing to the other application program 120, which will be described later. For example, the instruction sending unit 67 sends out an instruction to perform optical character recognition (OCR) processing on each of a plurality of partial areas 230 in the scanned image 200, to the cloud server 90. This instruction is sent along with image data regarding each of the partial areas 230.

The reception unit 68 is a processing unit configured to receive a result of processing (OCR processing result) performed on each partial area 230 from the cloud server 90 (application program 120).

The generation unit 70 is a processing unit configured to generate the electronic document 500 (see FIG. 4). The generation unit 70 generates the electronic document 500 (e.g., a searchable PDF document) by arranging a character string of the OCR processing result (text information or a group of character codes) for each of the partial areas 230 at each position detected for the partial area 230 in the scanned image 200. In particular, as will be described later, the character string of each processing result is arranged in the electronic document 500 on the basis of the arrangement-direction character size (character width) determined for each partial area 230 by the determination unit 69.

1-4. Operations

In the present embodiment, the external terminal 50 extracts each line of a character string area (row area) from the scanned image as a processing target area (partial area) for OCR processing, transmits the processing target area to the cloud server 90, and receives the result of OCR processing performed on the processing target area from the cloud server 90. The external terminal 50 then generates the electronic document 500 in which the OCR processing result for each processing target area is embedded. At this time, the aforementioned arrangement-direction character size (character width) is determined on the basis of the width of each row area (the length of a single row of character string in the arrangement direction (width direction)), and the character string of each OCR processing result that reflects the determined arrangement-direction character size is arranged in the electronic document 500.

Figure 5:
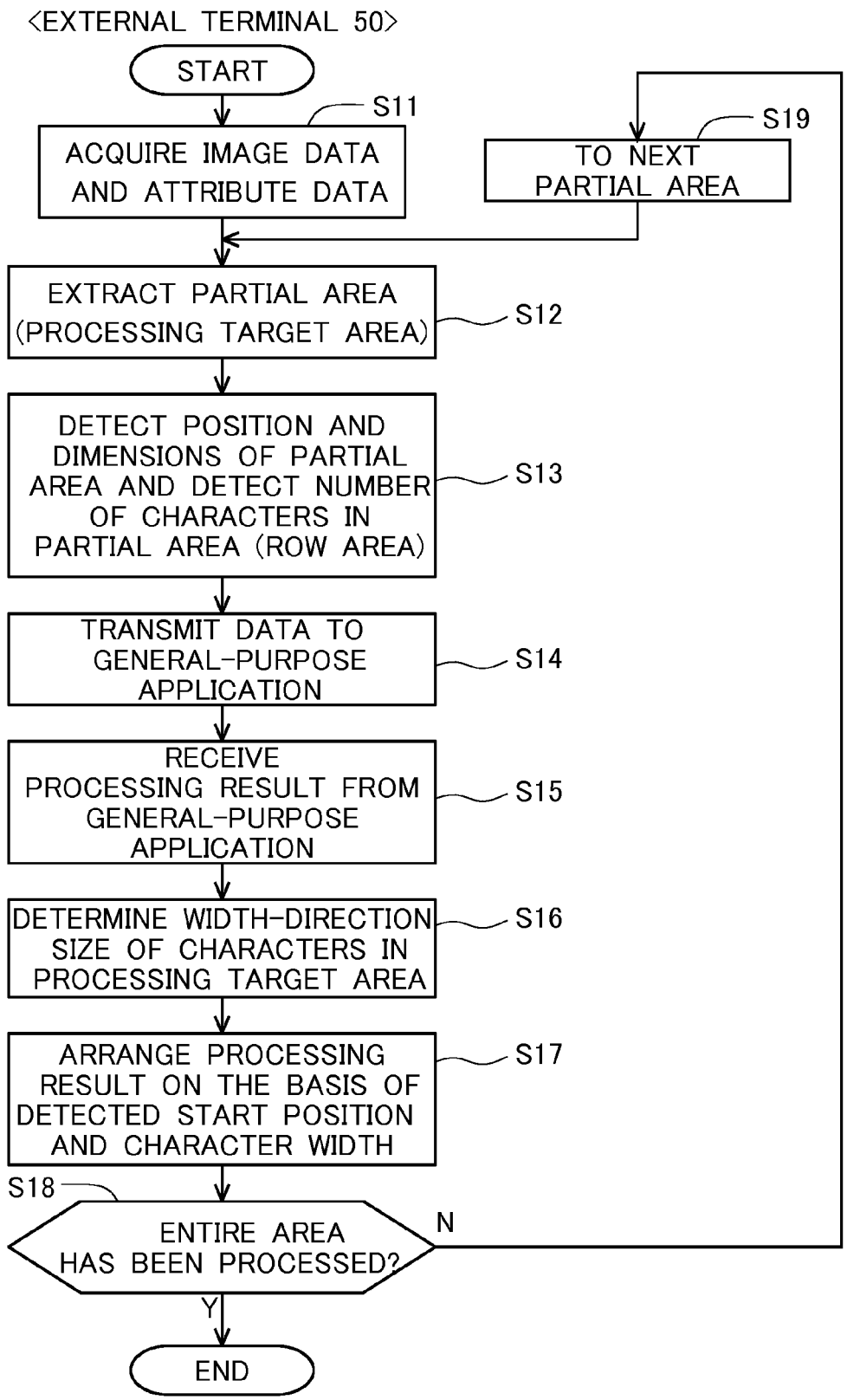
FIG. 5 is a flowchart of operations performed by the external terminal

Such a mode will now be described with reference to FIGS. 4 and 5. FIG. 4 illustrates an overview of operations performed in the electronic document generation system 1, and FIG. 5 is a flowchart of operations performed by the external terminal 50 (to be more specific, the electronic document generation application 110). The operations of the electronic document generation system 1 will now be described with reference to these drawings.

Generation of Scanned Image

First, a user places an original document to be scanned on a document platen (e.g., an automatic document feeder (ADF) or a glass platen for placing documents).

The user then operates the external terminal 50 to give an instruction to generate the electronic document 500 to the external terminal 50 and the MFP 10.

More specifically, first, the user designates a device to execute scan processing and a format of the electronic document 500 to be finally generated through the scan processing, on an operation screen (not shown) of the application (electronic document generation application) 110 installed in the external terminal 50. It is assumed here that the MFP 10 is designated as the device to execute scan processing, and searchable PDF (PDF with invisible text) is designated as the format of the electronic document 500. The user then presses an execution start button (a button for starting execution of processing for generating the electronic document 500) displayed on the operation screen of the electronic document generation application 110, so that an instruction to generate the electronic document (here, searchable PDF document) 500 is given to the external terminal 50 and the MFP 10. Note that the searchable PDF document (PDF document with invisible text) is an electronic document in a PDF format that includes an image layer containing a character image and a text layer in which the result of character recognition performed on the character image is embedded without being displayed.

The external terminal 50 receives input of this generation instruction and transfers the generation instruction (specifically, for example, an instruction to generate a scanned image in accordance with the generation instruction) to the MFP 10.

Upon receiving the generation instruction (e.g., the instruction to generate a scanned image) from the external terminal 50, the MFP 10 starts a scanning operation to generate the scanned image 200 of the original document placed on the document platen (e.g., ADF) of the MFP 10 (see the upper left of FIG. 4).

The MFP 10 further performs area discrimination processing for discriminating various types of areas in the scanned image 201. More specifically, the area discrimination unit 15 of the MFP 10 discriminates between the character area 210 and the non-character area (e.g., a graphics area) 220 in the scanned image 201 and identifies the range (specifically, the position and dimensions) of the character area 210 and the range of the non-character area 220 in the scanned image 200.

The area discrimination unit 15 also assigns an identification code (e.g., "1") that indicates that this area is a "character area" to the character area 210. Similarly, the area discrimination unit 15 assigns an area type code (e.g., "2" or "3") that indicates that this area is a "non-character area" to the non-character area 220. To be more specific, "2" is assigned to a "graphics area" that is the non-character area, and "3" is assigned to a "photographic area" that is the non-character area.

The area discrimination unit 15 then generates attribute definition data 300 on the basis of the above information. The attribute definition data 300 is data generated by assigning the above-described area type code to each pixel position in the scanned image 200 (data in which the area type code is assigned to each pixel in the scanned image 200). In other words, the attribute definition data 300 is generated to include information such as range information (specifically, information regarding the position and dimensions) and the area type code for each of the character area 210 and the non-character area 220 in the scanned image 200.

The MFP 10 (e.g., the communication unit 4 and the communication control unit 11) then transmits the scanned image 200 (specifically, image data of the scanned image) and the attribute definition data 300 to the external terminal 50.

OCR Processing and Electronic Document Generation Processing

Next, the external terminal 50 executes processing as illustrated in FIG. 5 by executing the electronic document generation application 110.

First, in step S11, the external terminal 50 (specifically, the acquisition unit 64, for example) receives and acquires the scanned image 200 and the attribute definition data 300, which are generated by the MFP 10, from the MFP 10. The external terminal 50 (specifically, the generation unit 70, for example) also tentatively generates a PDF document as the electronic document 500 by capturing the scanned image 200. Text data regarding the OCR processing result has not yet been embedded in this PDF document.

Then, in step S12, the external terminal 50 (e.g., the extraction unit 65) extracts partial areas 230 in predetermined units from the character area 210 of the scanned image 200 on the basis of the scanned image 200 and the attribute definition data 300 acquired in step S11. In the present embodiment, the extraction unit 65 extracts areas that each correspond to a single row of character string in the character area 210 as predetermined units of partial area 230. That is, the extraction unit 65 extracts each single row of partial area 230 from the character area 210. In other words, the extraction unit 65 extracts a plurality of partial areas 230 (here, the first partial area 230) that are obtained by dividing the character area 210 in units of areas that each correspond to a single row of character string in the character area 210.

Figure 6:
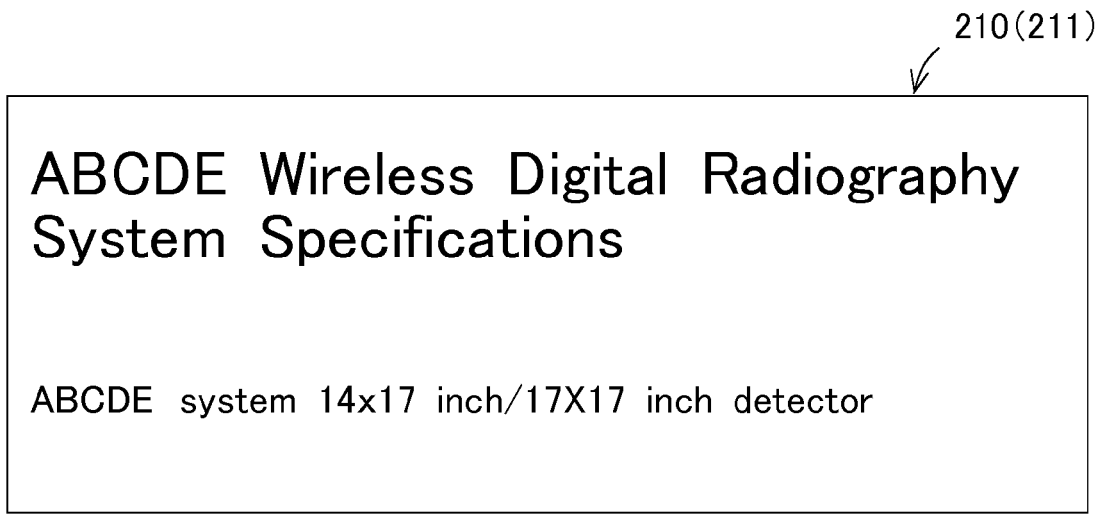
FIG. 6 illustrates a scanned image.

More specifically, the character area 210 in the scanned image 200 is identified on the basis of the scanned image 200 and the attribute definition data 300. The character area 210 is then subjected to image processing in which a single row of area (an area corresponding to a single row of character string arranged in the lateral direction) in the character area 210 is recognized. FIG. 6 illustrates an example of the character area 210 (211) consisting of three rows. In the case of this character area 210, an area (row area) 231 that corresponds to the first row of character string, "ABCDE Wireless Digital Radiography," is first extracted as a partial area 230 (see FIG. 7).

In step S13, the external terminal 50 (e.g., the detection unit 66) detects the position (specifically, a reference position (X, Y) such as a start position) and dimensions (X-direction size (width W) and Y-direction size (height H)) of the partial area 230 (in the scanned image 200) extracted in step S12. In step S13, the detection unit 66 also detects the number of characters in each partial area (row area) 230 (specifically, the number of characters included in each row area). The detected various types of information (information regarding the position and dimensions of the partial area 230 and the number of characters in the partial area 230) (see FIG. 8) is stored in the storage unit 55.

The upper section of FIG. 8 illustrates how these various types of information (an identification number of each partial area 230, information regarding the position (and dimensions), and the number of characters) are stored. Here, four pieces of information regarding the partial area 230, namely, the Y-direction position (TOP) of the upper side of the partial area 230 (rectangular area), the Y-direction position (BOTTOM) of the bottom side, the X-direction position (LEFT) of the left side, and the X-direction position (RIGHT) of the right side, are stored as the information regarding the position. These four pieces of information can be converted into, for example, the representative position (e.g., the position of the upper-left point (TOP, LEFT)) and dimensions (height H and width W) of the rectangular area (see the lower section of FIG. 8), and are thus also referred to as information regarding the position and dimensions of the partial area 230.

Figure 9:
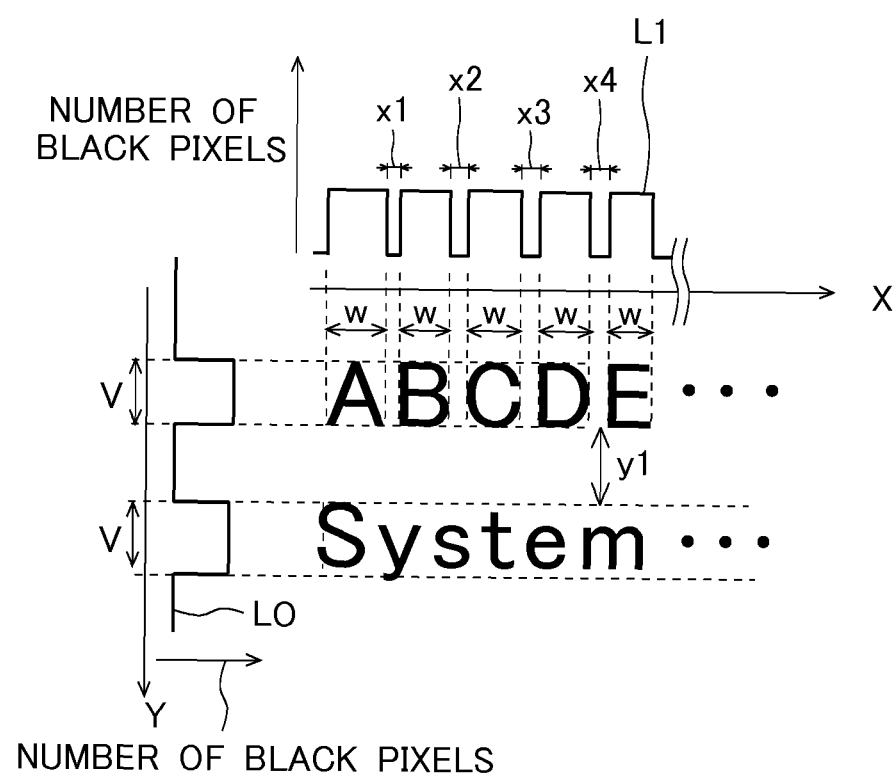
FIG. 9 illustrates processing such as extracting processing target areas.

The aforementioned processing for extracting each partial area 230 and various types of detection processing (steps S12 and S13) are performed as described below. The following is a detailed description of the above processing with reference to FIG. 9 and other drawings. FIG. 9 is a diagram for explaining such processing.

More specifically, first, an operation of detecting the number of black pixels per line (horizontal line or horizontal pixel row) extending in the X direction (main scanning direction; referred to also as a horizontal or left-right direction) for each horizontal line is repeatedly performed along with movement in the Y direction (sub-scanning direction or vertical direction) to acquire the number of black pixels for each horizontal line.

A graph on the left side of FIG. 9 shows a curve L0 that schematically indicates the number of black pixels at each position in the Y direction. To simplify the graph, every number of black pixels that is greater than or equal to a predetermined number is uniformly illustrated as the same number of pixels. The graph is thus in the form of a square wave.

A horizontal line at a position where characters are present includes a relatively large number of black pixels. On the other hand, a horizontal line in a space between rows (horizontal line in an interlinear area where no characters are present) includes little black pixels.

Using this feature, the extraction unit 65 recognizes a range V (Y-direction range) of a horizontal line that includes a predetermined number or more of black pixels, as a range of a single row of character string (range of the character string in the height direction). For example, the range from the top to the bottom of the character string "ABCDE..." is regarded as the range V of a single row of character string. Similarly, the range from the top to the bottom of the character string "System..." is also recognized as the range V of a single row of character string.

Regarding the vertical direction (Y direction), a rectangular area in this range V is regarded as an existence area (row area) of a single row of character string in the scanned image 200. Regarding the horizontal direction (X direction), a range that includes the first character (here, the character on the left edge) to the last character (the character on the right edge) in a single row of character string is regarded as an existence area of the single row of character string. The processing for recognizing the horizontal existence range of a character string may be performed using the result of processing for recognizing the number of characters, which will be described later.

The present invention is, however, not limited to this example. For example, in the case of the horizontal direction (X direction), the whole (horizontal) range of the character area 210 (the range that is the same as the entire width of the scanned image) may be recognized as an existence area of a single row of character string.

The row area recognized in this way (existence area of a single row of character string in the scanned image 200) is extracted as a partial area 230 (step S12). For example, the row area (rectangular area) 231 of the first single row of character string, "ABCDE Wireless Digital Radiography," (see FIG. 7) is extracted as a partial area 230.

Also, the position of the upper-left (or lower-left) point of this partial area (rectangular area) 230 is recognized as the position (representative position) of the rectangular area (existence area of the single row of character string) (step S13). For example, the position of the upper-left point of the rectangular area 231 including the single row of character string, "ABCDE Wireless Digital Radiography," is recognized as the position (start position) of the existence area of this single row of character string.

Moreover, the dimensions (the X-direction size (width W) and the Y-direction size (height H)) of this rectangular area 230 are recognized and detected. For example, the dimensions (width W1 and height H1) of the rectangular area 231 are recognized on the basis of the coordinate value (LEFT, TOP) of the upper-left point P1 and the coordinate value (RIGHT, BOTTOM) of the lower-left point P2. More specifically, the width W1 is calculated as a value of difference between the X coordinate values of the points P1 and P2 (i.e., W1=RIGHT−LEFT), and the height H1 is calculated as a value of difference between the Y coordinate values of the points P1 and P2 (i.e., H1=BOTTOM−TOP).

The extraction unit 65 also recognizes the range (Y-direction range) of a horizontal line whose number of black pixels is less than a predetermined number, as the range of an interlinear area (range in the height direction). For example, a blank area between the lower edge of the character string "ABCDE . . . " and the upper edge of the character string "System . . . " is recognized as the range of an interlinear area between the first and second rows. Through this processing, the extraction unit 65 calculates a space between a certain row and the next row (the Y-direction dimension of the interlinear area) as an interlinear space y (space between adjacent rows). Although in the present embodiment, a horizontal line whose number of black pixels is less than a predetermined number is immediately determined as an interlinear area, the present invention is not limited to this example. For example, when the consecutive number of "horizontal lines whose number of black pixels is less than a predetermined number" is greater than or equal to a predetermined threshold value TH1 (e.g., several lines that correspond to approximately one to two millimeters) (see FIG. 7), the existence area of such (a group of) horizontal lines may be regarded as an interlinear area. In this case, it is possible to favorably distinguish and extract a plurality of row areas that are adjacent in the height direction of the character string.

In step S13, the detection unit 66 also detects the number of characters in each partial area 230 (row area).

More specifically, an operation of detecting the number of black pixels per line (vertical or longitudinal line) extending in the Y direction in the area (strip or rectangular area extending in the X direction) that corresponds to the existence range V of a single row of character string in the Y direction is repeatedly performed along with movement in the X direction to acquire the number of black pixels per vertical line. Through this operation, it is possible to obtain an existence area of each character (existence range w of each character in the width direction) in the strip area.

A graph on the upper side of the first row of character string in FIG. 9 shows a curve L1 that schematically indicates the number of black pixels at each position in the X direction of the first row of character string. To simplify the graph, every number of black pixels that is greater than or equal to a predetermined number is uniformly illustrated as the same number of pixels.

A vertical line at a position where characters are present includes a relatively large number of black pixels. On the other hand, a vertical line in a space between characters (vertical line in a character-spacing area where no characters are present) includes little black pixels.

Using this feature, the extraction unit 65 recognizes the range (X-direction range) of a vertical line that includes a predetermined number or more of black pixels, as the range w of the width of a single character (range in the width direction). For example, the range from the left edge to the right edge of a character "A" is recognized as the range w of the character. The same applies to the subsequent characters "B," "C," "D," "E," and so on. Then, the number of areas that have been recognized as existence areas of characters in the existence range (row area) of a single row of character string is detected as the number of characters in the row area (the number of characters included in the row area).

Through this operation of recognizing the positions of the first and last characters in the strip area (row area), the range that includes the first character (here, the character on the left edge) and the last character (here, the character on the right edge) in a single row of character string included in the row area is recognized as an existence area of the single row of character string.

Moreover, the space (gap) between the character of interest and a character adjacent on the right of the character of interest, more specifically, the space (gap) between the right edge of the character of interest and the left edge of the character adjacent to the right of the character of interest, is calculated as character spacing (spacing between adjacent characters) x.

In this way, in step S13, the position and dimensions of the partial area 230 are detected through image processing, and the number of characters in the partial area 230 is also detected through image processing.

Next, in step S14 (FIG. 5), the external terminal 50 (e.g., the instruction sending unit 67) sends out (transmits) an instruction to perform processing on the partial area 230 (instruction to perform OCR processing) and image data regarding the partial area 230 to the cloud server 90. In other words, a request for OCR processing is sent out from the electronic document generation application 110 to the application 120. Here, image data of an image (partial image) obtained by extracting a portion that corresponds to the partial area 230 from the scanned image 200 (also referred to as "image data of the partial area 230") is transmitted as the image data regarding the partial area 230.

Note that the application 120 (here, OCR processing application for performing OCR processing) is an application different from the electronic document generation application 110. In the present example, the application 120 is an application that is installed into and executed by the cloud server 90.

When the application 120 that is being executed by the cloud server 90 has received the aforementioned processing instruction and image data regarding the partial area 230, the cloud server 90 (application 120) executes OCR processing on the basis of the processing instruction and the image data.

Figure 10:
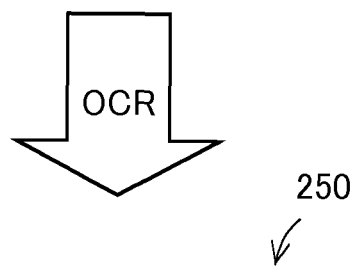
FIG. 10 illustrates data including text data generated through OCR processing.

The application 120 performs OCR processing on the image data regarding the partial area 230, which has been received from the electronic document generation application 110, recognizes a character string (e.g., "ABCDE Wireless Digital Radiography") included in the image data, and generates text data (group of character codes) 250 of the character string (see FIG. 10). The application 120 then outputs the text data (text information) 250 of the character string as a result of the OCR processing to the electronic document generation application 110. In other words, the processing result is sent out (transmitted) from the cloud server 90 (application 120) to the external terminal 50 (electronic document generation application 110).

In step S15, the external terminal 50 (e.g., the reception unit 68) receives the processing result (result of the OCR processing performed on the partial area 230) from the application 120. Note that this processing result includes the text data 250, but does not include position information and font information.

In step S16, the external terminal 50 (e.g., the determination unit 69) determines the size in the arrangement direction of characters in the partial area 230 (i.e., the arrangement-direction character size (here, the character width)) on the basis of the dimensions of the partial area 230. More specifically, the character width in the partial area 230 is determined on the basis of a value Q (=W/N) obtained by dividing the length W of the partial area 230 (here, an area of a single row of character string) in the left-right direction (lateral direction) by the number N of characters in the partial area 230.

For example, a font size (font point (pt) size) corresponding to the value Q is determined as a value representing the character width of characters in the partial area 230. To be more specific, the font size corresponding to the value Q is determined on the basis of a data table that previously defines a correspondence relationship between the value Q and the font point size (point number) (i.e., a data table that defines the range of the value Q corresponding to each font point size).

The present invention is, however, not limited to this example, and the value Q itself (e.g., a value in units of millimeters (mm)) may be determined as a value representing the character width of characters in the partial area 230.

Alternatively, the value Q may be adjusted and calculated in consideration of a blank area (e.g., blank characters) included in the character string. To be more specific, a value obtained by multiplying the original value Q by a predetermined adjustment coefficient (e.g., 0.9) may be used as a new adjusted value Q.

In step S17, the external terminal 50 (e.g., the generation unit 70) arranges the text data 250 (data received in step S15), which is the result of processing performed on the partial area 230, at the position where the partial area 230 has been detected (position detected in step S13) in the electronic document 500 (see also FIG. 4). The text data 250 is arranged at the position where the partial area 230 is detected (in the scanned image 200) (i.e., position detected in step S13) in the scanned image 200 that is captured into the electronic document 500 (PDF document). More specifically, the generation unit 70 embeds the text data regarding the result of processing performed on the partial area 230 (OCR processing result) at the position where the partial area 230 has been detected, without being displayed. In other words, the text data of the OCR processing result for the partial area 230 is arranged at the position where the partial area 230 has been detected in a text layer (not displayed) of the searchable PDF document. Through this, the content of the electronic document (searchable PDF document) 500 is updated.

At this time, each character in the partial area 230 is embedded to have the character width (arrangement-direction character size) determined in step S16.

Thus, as illustrated in FIG. 11, each character of the OCR processing result is arranged at a position relatively close to the position of the character that is displayed as an image in the scanned image 200. FIG. 11 illustrates the result of character arrangement according the present embodiment. In FIG. 11, two types of character strings (characters stings before and after the OCR processing) are displayed overlapping each other. The characters of the OCR processing result (character string after the OCR processing) are displayed in a light color, and the characters displayed as an image in the scanned image 200 (character string before the OCR processing) are displayed in an ordinary color.

FIG. 12 illustrates a result of character arrangement according to a comparative example. In FIG. 12, similarly to FIG. 11, two types of character strings (character strings before and after the OCR processing) are displayed overlapping each other. FIG. 12 illustrates a situation in which when the size of characters of the processing result greatly differs from the size of characters displayed as an image in the scanned image 200, the characters of the processing result are arranged at quite different positions from those of the characters displayed as an image in the scanned image 200. In FIG. 12, characters on the back edge (right edge) of the character string are greatly shifted from their original positions in the left-right direction.

On the contrary, the above-described embodiment can avoid or reduce the occurrence of such a situation as illustrated in FIG. 12 and, as illustrated in FIG. 11, can arrange the characters of the processing result at positions relatively close to the positions of the characters displayed as an image in the scanned image 200 in the left-right direction.

Here, the characters of the OCR processing result are each assumed to have a standard aspect ratio. Then, the orthogonal-direction character size is determined to have the same font point size (e.g., 26 points (pt)) as the arrangement-direction character size. To be more specific, a single common character size (e.g., font point size (26 points)) is specified as the arrangement-direction character size and the orthogonal-direction character size, and the characters of the OCR processing result are arranged in the electronic document 500 on the basis of the specified common character size (font point size). Consequently, the characters of the OCR processing result are arranged in the electronic document 500 to have the arrangement-direction character size that is the specified font point size and the orthogonal-direction character size that is also the specified font point size.

The present invention is, however, not limited to this example, and the orthogonal-direction character size (character height) of characters having a standard aspect ratio may be determined on the basis of the arrangement-direction character size (character width) by multiplying the above value Q by a predetermined coefficient (conversion coefficient for the aspect ratio).

In step S18, it is determined whether or not the processing has been completed for the entire character area 210 (here, all rows (all row areas) in the character area 210) in the scanned image 200. To be more specific, the presence or absence of the next "row" (here, the second row) in the character area 210 is detected (determined). When the presence of the next row (unprocessed row) has been detected, it is determined that the processing has not yet been completed for the entire character area 210. On the other hand, when the absence of the next row (unprocessed row) has been detected, it is determined that the processing has been completed.

When it is determined that the processing has not yet been completed for the entire scanned image 200, the procedure returns to step S12 via step S19, and the operations of steps S12 to S17 are performed in the same manner for the next partial area 230 (here, the next row of image area).

On the other hand, when it is determined that the processing has been completed for the entire scanned image 200, the operations of the flowchart in FIG. 5 is completed. The electronic document 500 (to be more specific, searchable PDF document) is generated through execution of the processing of steps S12 to S17 on each of a plurality of partial areas 230 in the character area 210 of the scanned image 200. Note that the electronic document 500 is stored in the storage unit 55 of the external terminal 50. As a result of the processing described above, the character area 210 of the scanned image 200 is arranged in a corresponding area 510 of the electronic document 500 as illustrated in FIG. 4. The non-character area 220 of the scanned image 200 is directly arranged in a corresponding area 520 of the electronic document 500 without going through the OCR processing.

As described above, in the external terminal 50 of the first embodiment, the electronic document generation application 110 executed in the external terminal 50 acquires the scanned image 200 or the like generated by the image forming apparatus 10. The electronic document generation application 110 extracts a plurality of partial areas 230 from the scanned image 200, and acquires and stores information regarding the position of each of the partial areas 230 (in the scanned image 200). The electronic document generation application 110 then sends out an instruction to perform OCR processing on each of the partial areas 230 to the application 120 (here, general-purpose OCR processing application). The application 120 returns the OCR processing result to the electronic document generation application 110. The electronic document generation application 110 generates an electronic document (searchable PDF document) in which the returned OCR processing result (the result of OCR processing performed on each of the plurality of partial areas 230) is arranged at the position of each of the partial areas in the scanned image 200.

It is thus possible to generate an electronic document in which the OCR processing results (text data) are arranged at appropriate positions in the scanned image 200 even when the electronic document generation application 110 requests the other application 120 to perform OCR processing.

The external terminal 50 extracts an area (row area) of a single row of character string as a processing target area from the scanned image 200, and determines the arrangement-direction character size (character width in the case of horizontal writing) of characters in the processing target area on the basis of the dimensions of the row area. Then, the character string of the OCR processing result is arranged in the electronic document on the basis of the arrangement-direction character size (see FIG. 11). To be more specific, the character string of the OCR processing result is arranged in the electronic document to have the arrangement-direction character size. This avoids or reduces the occurrence of the aforementioned situation as illustrated in FIG. 12 and makes it possible to arrange the characters of the OCR processing result at positions relatively close to the positions of the characters displayed as an image in the scanned image 200 in the arrangement direction of the character string. In other words, the character string of the OCR processing result can be arranged at a relatively accurate position in the arrangement direction.

The above-described embodiment uses the OCR processing service provided by the apparatus (cloud server 90) located outside the MFP 10. This allows OCR processing to be performed by another device (cloud server) different from the client device (e.g., the external terminal 50) that has requested the OCR processing. It is thus possible to reduce the processing load on the client device.

The above-described embodiment can also reduce the processing load on the MFP 10 because the processing for generating the electronic document 500 (such as extracting each partial area 230 and detecting the position) is performed by another device (external terminal 50) different from the MFP 10, which is the apparatus for generating the scanned image 200. In other words, the processing load can be appropriately distributed between the MFP 10 and the external terminal 50.

While in the above-described embodiment, the attribute definition data 300 is generated by the MFP 10 and transmitted to the external terminal 50, the present invention is not limited to this example, and the attribute definition data 300 may be generated by the external terminal 50.

2. Second Embodiment

A second embodiment is a variation of the first embodiment. The following description focuses on differences from the first embodiment.

In the above-described first embodiment, the arrangement-direction character size (dimensions (character width) of a single character in the arrangement direction of a character string) is determined on the basis of the length of a single row of character string in the arrangement direction.

In the second embodiment, the orthogonal-direction character size (character height) is determined on the basis of the dimensions (here, height) of the existence area (row area) of a single row of character string in the direction (orthogonal direction) orthogonal to the arrangement direction of the single row of character string, and the arrangement-direction character size (dimensions (character width) of a single character in the arrangement direction of the character string) is determined (estimated) on the basis of the determined orthogonal-direction character size. In short, the character width of each character in the character string is indirectly determined on the basis of the height of the character string.

The second embodiment differs from the first embodiment in that the processing for detecting the number of characters in the row area is not performed in step S13 of FIG. 5.

The second embodiment also differs from the first embodiment in the processing performed in step S16 of FIG. 5.

Specifically, first, the "orthogonal-direction character size" (character size in the orthogonal direction (here, height direction) orthogonal to the arrangement direction of a single row of character string) is determined for a single row of character string included in the processing target area (partial area 230) on the basis of the height (value detected in step S13) of the partial area 230. That is, the "character height" is determined for the single row of character string. Then, the arrangement-direction character size (here, character width) of characters in the processing target area is determined (more specifically, estimated and determined) on the basis of the determined orthogonal-direction character size (character height).

For example, when it is determined that the height H1 of the partial area 231 (FIG. 7) has a value h1 (millimeters (mm)), it is determined that this value h1 itself (or, for example, a value obtained by multiplying the value h1 by a predetermined coefficient such as 0.9) is the "character height" for the single row of character string included in the partial area 231. Next, the font point size (e.g., 26 points) corresponding to this character height is obtained. Then, it is estimated and determined that the "character width" of characters in the partial area 230 is the dimension corresponding to the font point size. That is, a standard "character width" corresponding to the "character height" is estimated and determined Note that the "character width" of characters in the partial area 230 may be specified as the font point size (e.g., 26 points), or may be specified as the character width in units of millimeters (mm) corresponding to the font point size.

In step S17, the character string (text information) of the OCR processing result is embedded on the basis of the arrangement-direction character size determined in step S16. More specifically, each character constituting the character string in the processing target area is arranged to have the dimension that is determined as the aforementioned arrangement-direction character size (character width) in the arrangement direction. In this way, the arrangement-direction character size is used to arrange the character string of the OCR processing result in the electronic document 500, and this produces the electronic document 500.

Note that the "orthogonal-direction character size" of each character of the OCR processing result may be specified as the above value h1. Then, the specified orthogonal-direction character size may be used to arrange each character of the OCR processing result in the electronic document 500. Alternatively, the same font point size as the arrangement-direction character size may be specified as the orthogonal-direction character size of each character of the OCR processing result. In other words, a commonly specified character size (font point size) may be used as a basis to arrange each character of the OCR processing result in the electronic document 500.

3. Third Embodiment

In the above-described embodiments, the arrangement-direction character size (e.g., character width) is determined for each partial area (processing target area) 230, and the orthogonal-direction character size (e.g., character height) for the partial area 230 is determined in connection with the arrangement-direction character size. To be more specific, the arrangement-direction character size and the orthogonal-direction character size are determined on the assumption that each character of the OCR processing result has a standard aspect ratio.

The present invention is, however, not limited to this example. For example, the orthogonal-direction character size (e.g., character height) for the partial area 230 may be determined independently of the arrangement-direction character size (e.g., character width).

The processing for detecting the number of characters in the row area is not performed in step S13 of the second embodiment, but it is performed in step S13 of the third embodiment.

More specifically, the number of characters in one single row area in each partial area 230 is detected in step S13. For example, the number of characters in the row area 231 that corresponds to the first row of the partial area 236 is detected. The present invention is, however, not limited to this example, and the number of characters in a row area that corresponds to any single row may be detected. For example, it is possible to detect the number of characters in a row area that corresponds to a row having the greatest horizontal width among a plurality of rows.

After the processing of steps S14 and S15, the following processing is performed in step S16.

First, the arrangement-direction character size (e.g., character width) in the processing target area is determined in the same manner as in the first embodiment. More specifically, the arrangement-direction character size (e.g., character width) in the processing target area is determined on the basis of a value obtained by dividing the length of the row area in the arrangement direction by the number of characters in the row area (e.g., step S16).

The orthogonal-direction character size (e.g., character height) in the processing target area is determined in the same manner as in the second embodiment. More specifically, the orthogonal-direction character size in the processing target area is determined on the basis of the orthogonal-direction character size that is the size of characters in a single row of character string included in the processing target area and that is the character size in the direction orthogonal to the arrangement direction of the character string (step S16).

In step S17, the character string (text information) of the OCR processing result is embedded to have character sizes that are independent from each other in the two directions, on the basis of the two sizes (arrangement-direction character size and the orthogonal-direction character size) determined in step S16. More specifically, each character constituting a character string in the processing target area is arranged to have a dimension (e.g., 26-point width) determined as the aforementioned arrangement-direction character size (character width) in the arrangement direction of the character string and to have a dimension (e.g., 28-point width) determined as the aforementioned orthogonal-direction character size (character height) in the orthogonal direction of the character string. In this way, the independent sizes (arrangement-direction character size and the orthogonal-direction character size) in the two directions are used to arrange the character string of the OCR processing result in the electronic document 500 and generate the electronic document 500.

Note that the arrangement-direction character size and the orthogonal-direction character size may be represented by actual values (e.g., in units of millimeters (mm)) indicating the sizes, or may be represented by the "font point number." As another alternative, one of the sizes may be represented by, for example, a ratio relative to the other size. For example, the arrangement-direction character size may be represented as "150%" of the orthogonal-direction character size (e.g., font point size). Conversely, the orthogonal-direction character size may be represented as "66%" of the arrangement-direction character size (e.g., font point size). The same applies to the other embodiments.

4. Fourth Embodiment

The above-describe embodiments take the example of the case where a plurality of partial areas 230 are extracted and transmitted in units of rows in the character area 210 (in other words, the case where each partial area 230 is an area of a single row of character string (single row area)), the present invention is not limited to this example. For example, a plurality of partial areas 230 may be extracted and transmitted in units of areas that span a plurality of rows. That is, an area that includes a plurality of rows of character string in the character area 210 may be used as a unit to extract and transmit a plurality of partial areas 230. To be more specific, a plurality of partial areas obtained by dividing the character area into paragraphs may be extracted and transmitted (in units of paragraphs). This increases the size of each processing target area and reduces the number of processing target areas to be extracted from the scanned image, as compared with the case in the first embodiment. That is, efficient communication is possible as a result of, for example, an increased amount of image data (amount of data transferred) per request for OCR processing, a reduced number of requests for OCR processing, and reduced overhead in communication. This improves processing efficiency.

The fourth embodiment describes a case where the above-described modification is made to the second embodiment. The following description focuses on differences from the second embodiment.

In step S12 (see FIG. 5) performed after step S11, processing target areas (partial areas 230) are extracted in units of paragraphs from the character area 210 of the scanned image 200. That is, an area that includes one or a plurality of rows of character string (in other words, an area that includes one or a plurality of row areas) is extracted as a partial area 230.

To be more specific, interlinear spacing y is calculated after the extraction of a row area, which is a single row of character string, in the same manner as in the first embodiment. Then, it is determined whether or not a row of interest and the next row belong to the same paragraph, depending on whether or not the interlinear spacing y between the row of interest and the next row is smaller than a predetermined threshold value TH2. Here, the threshold value TH2 is greater than the aforementioned threshold value TH1 (TH2>TH1) and ranges from several millimeters to a dozen millimeters, for example.

Figure 7:
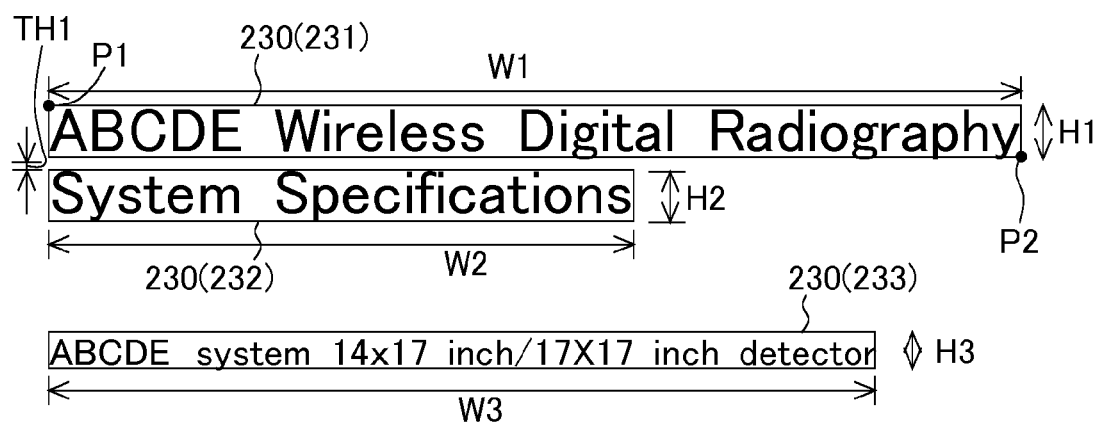
FIG. 7 illustrates how three partial areas (processing target areas) are extracted.

In the above-described embodiments, three partial areas 230 (231, 232, and 233) as illustrated in FIG. 7 are extracted as processing target areas (processing unit areas) from the scanned image in FIG. 6.

Figure 13:
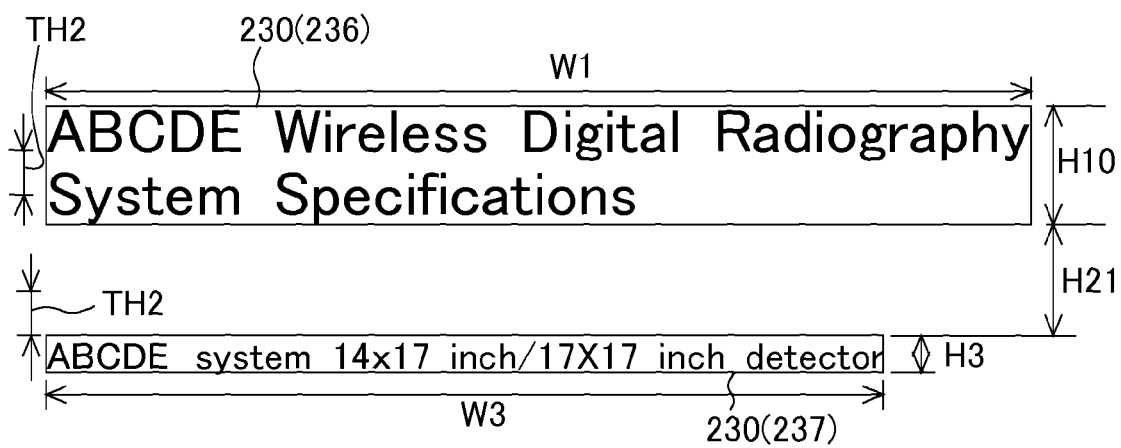
FIG. 13 illustrates how two partial areas are extracted (fourth embodiment).

On the other hand, in the fourth embodiment, two partial areas 230 (236 and 237) as illustrated in FIG. 13 are extracted as processing target areas (processing unit areas) from the scanned image in FIG. 6. It is determined that the interlinear spacing y between the two row areas 231 and 232 in FIG. 7 is smaller than the threshold value TH2 and therefore that the row areas 231 and 232 belong to the same paragraph. On the other hand, it is determined that the interlinear spacing y (H21) between the row area 232 and the row area 233 next to the row area 232 is greater than the aforementioned threshold value TH2 (H21>TH2) and therefore that the row area 232 and 233 belong to different paragraphs.

Consequently, the partial area 236 that contains the two row areas 231 and 232 is extracted as a single processing target area as illustrated in FIG. 13. The partial area 237 determined as belonging to a different paragraph is separated from the partial area 236 and extracted as another processing target area.

In step S12 of the fourth embodiment, one or a plurality of "row areas (areas each corresponding to a single row of character string)" included in each partial area 230 are also extracted. More specifically, the processing for identifying row areas is performed using the threshold value TH1 as described above. Thus, for example, the two row areas 231 and 232 included in the partial area 236 are also extracted.

In step S13 and onward, the same processing as described in the second embodiment is performed on each partial area (area including one or a plurality of row areas).

For example, the position and dimensions of the partial area 230 (236 or 237) are detected in step S13.

Figure 14:
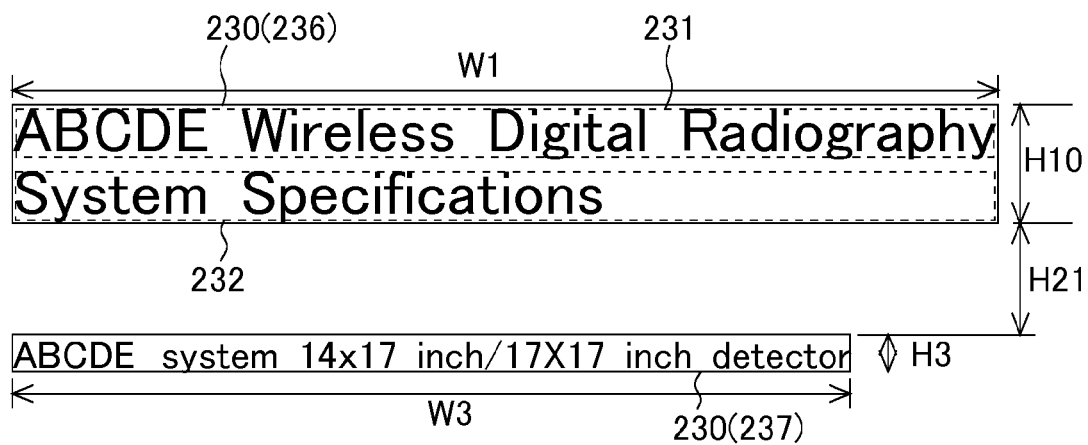
FIG. 14 illustrates row areas in the partial area.

When the partial area includes a plurality of rows of character string, the position and dimensions of a row area (area of character string) that corresponds to each of the plurality of rows are also detected. For example, the positions and dimensions of the row areas 231 and 232 included in the partial area 236, which includes a plurality of rows, are also detected (see FIG. 14).

In step S13, the number of row areas in each partial area 230 (in other words, the number of rows of character string included in each processing target area 230) is also detected. For example, the number of row areas in the partial area 236 is "2", and the number of row areas in the partial area 237 is "1."

Thereafter, the processing of steps S14 and S15 is executed, and the arrangement-direction character size is determined in the next step S16.

More specifically, the length (height) of "row areas" included in a processing target area (e.g., partial area 236) in the orthogonal direction (Y direction) is detected on the basis of the length (height) of the processing target area in the Y direction (up-down direction) and the number of rows of character string included in the processing target area. For example, a value (=H10/M) obtained by dividing the length (height) H10 (see FIG. 14) of the partial area 236 in the Y direction by the number M of rows of character string ("2") included in the partial area 236 is calculated as the Y-direction length of the row areas. In the present embodiment, an average value of "character heights" in a plurality of row areas included in the partial area 236 is detected as the length (height) of the "row areas" in the orthogonal direction (Y direction) and determined as the character height of characters in this partial area 236 (processing target area).

Then, the orthogonal-direction character size (character height) in the partial area 236 (processing target area) including these row areas is determined on the basis of the calculated length of the row areas in the orthogonal direction. For example, the length of the row areas in the orthogonal direction is directly determined as the orthogonal-direction character size (character height) in the partial area 236 (processing target area).

Next, the font point size (e.g., 26 points) corresponding to this "character height" (H10/M) is obtained. Then, it is estimated and determined that the "character width" of characters in the partial area 230 is a dimension corresponding to the obtained font point size. That is, a standard "character width" corresponding to the "character height" is estimated and determined.

Thereafter, the arrangement-direction character size (character width) in the processing target area may be determined in the same manner as in the second embodiment on the basis of the orthogonal-direction character size (character height) in the processing target area.

The processing of step S17 and onward is also performed in the same manner.

For example, in step S17, the character string (text information) of the OCR processing result is embedded on the basis of the arrangement-direction character size determined in step S16. More specifically, each character constituting a character string in the processing target area is arranged to have a dimension determined as the aforementioned arrangement-direction character size (character width) in the arrangement direction of the character string. Note that when the partial area includes a plurality of rows of character string, the characters in every row of character string in the partial area may be arranged to have the same dimension.

In this way, the character string of the OCR processing result is arranged in the electronic document 500 on the basis of the arrangement-direction character size, and this generates the electronic document 500.

The fourth embodiment describes the example of the case where the aforementioned modification is made to the second embodiment, but the present invention is not limited to this example. For example, the same modification may be made to the first embodiment or to the third embodiment.

In such cases, when the partial area 230 includes a plurality of row areas, it is not always necessary, in the case of determining the arrangement-direction character size, to calculate the number of characters in all of the row areas (all rows of character string), and instead, it is possible to calculate the number of characters in an arbitrary one of the plurality of row areas.

For example, a case is possible in which the "number of characters" in a row area corresponding to the first one of a plurality of rows is calculated, and the "arrangement-direction character size" is determined on the basis of a value obtained by dividing the width of this row area by the number of characters in the row area.

Then, the calculated arrangement-direction character size is regarded as the "arrangement-direction character size" of all characters in (not only the row area but also) the partial area 230 including this row area, and used as a basis to arrange the character strings of the partial area 230 in the electronic document 500. In this case, the operation of calculating the number of characters needs to be performed on only some of the plurality of rows of character string, and therefore, it is possible to increase the speed of the processing. Since it is often the case that characters in a plurality of rows of character string included in the same paragraph have the same size, the plurality of rows of character string of the OCR processing result can be arranged at relatively accurate positions in the arrangement direction.

The above-described fourth embodiment takes the example of the case where the height of "row areas" included in a processing target area (e.g., partial area 236) is detected on the basis of the height of the processing target area and the number of rows of character string included in the processing target area, and the "arrangement-direction character size" is determined on the basis of the "height" of the row areas, but the present invention is not limited to this example.

For example, a case is also possible in which the "height" of a row area corresponding to the first one of a plurality of rows is detected through image processing, and the "arrangement-direction character size" is determined on the basis of the "height" of this row area.

5. Fifth Embodiment

The above-described first to third embodiments take the example of the case where an area of a single row of character string (specifically, the whole range of a single row of character string) is extracted and transmitted as a processing target area (partial area), but the present invention is not limited to this example. For example, in consideration of a case where a single row of character string includes a relatively large space, small areas obtained by dividing the single row of character string by such a space may each be extracted and transmitted as a processing target area (partial area). In other words, a row area of a partial range out of the whole range of a single row of character string (i.e., a small area within a single row) may be extracted and transmitted as a processing target area (partial area).

A fifth embodiment describes a case where such a modification is made to the first embodiment. The following description focuses on differences from the first embodiment.

Figure 15:
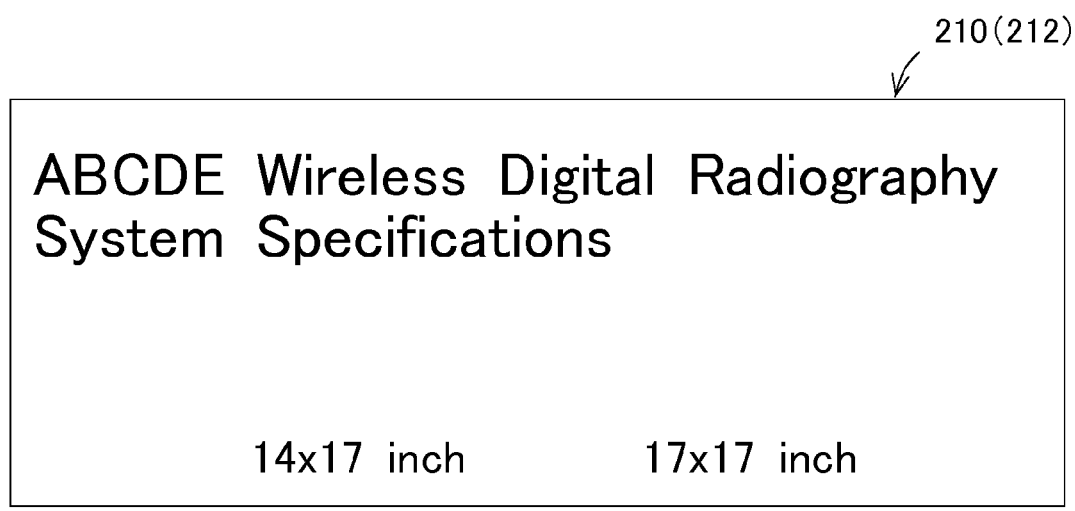
FIG. 15 illustrates another scanned image.
Figure 16:
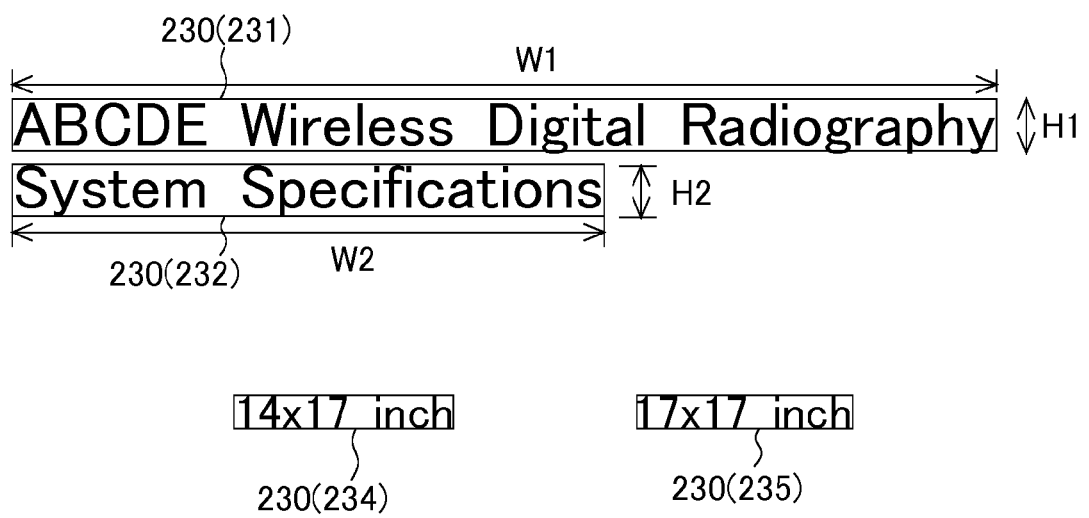
FIG. 16 illustrates how four partial areas (processing target areas) are extracted.

In step S12 (FIG. 5) of the fifth embodiment, an area 234 corresponding to a character string, "14×17 inch," and an area 235 corresponding to a character string, "17×17 inch," in the bottom row of character string in the character area 210 (212) in FIG. 15 are extracted as different partial areas 230 (see also FIG. 16).

To be more specific, the extraction unit 65 calculates front spacing p and back spacing q for a row of interest, the front spacing p being spacing between a character of interest in the row of interest and a character immediately before the character of interest, and the back spacing q being spacing between the character of interest and a character immediately after the character of interest. Note that the spacing p between adjacent characters and the spacing q between adjacent characters may be calculated in the same manner as the aforementioned character spacing x (spacing between adjacent characters).

When it is determined that the back spacing q is greater than the front spacing p to more than a predetermined extent, the extraction unit 65 determines that a significant blank area exists between the character of interest and the character immediately after the character of interest, and extracts two small areas on both sides of the blank area as different partial areas. In other words, the character of interest and the character immediately after the character of interest are determined as belonging to different partial areas. Thus, the small area that includes the character of interest and the character immediately before the character of interest and the small area that includes the character immediately after the character of interest are extracted as different partial areas.

More specifically, when the ratio (q/p) of the value q to the value p is greater than a predetermined threshold value TH2 (e.g., 500%), it is determined that a significant blank area exists between the character of interest and the character immediately after the character of interest. On the other hand, when the ratio (q/p) is smaller than the predetermined threshold value TH2, it is determined that no significant blank area exists between the character of interest and the character immediately after the character of interest, and there two characters, namely, the character of interest and the character immediately after the character of interest, belong to the same partial area. This processing is sequentially performed on a plurality of characters in the first row in order from one side (e.g., left side) to the other side (e.g., right side). Consequently, when a significant blank area is present, two small areas on both sides of the blank area are extracted.

Accordingly, for example, the area 234 corresponding to the character string, "14×17 inch," and the area 235 corresponding to the character string, "17×17 inch," are extracted as different partial areas as illustrated in FIG. 16.

In this way, small areas in a single row may be separated from each other by a significant blank portion and extracted as a partial area 230. In other words, an area (small area) of a partial range out of the whole range of a single row of character string in the arrangement direction may be extracted as a processing target area.

In step S13 and onward, the same processing as described in the first embodiment is executed on each partial area (small area). For example, processing such as detecting the position and dimensions of each partial area (small area) is executed in step S13, and processing such as OCR processing is executed on each partial area (small area) in steps S14 and S15. In step S16, the orthogonal-direction character size is calculated on the basis of the length of each of the above-described small areas (area of a partial range out of the whole range of a single row of character string in the arrangement direction), and the arrangement-direction character size of characters in the processing target area is determined on the basis of the orthogonal-direction character size. In step S17, the character string in each small area is arranged in the electronic document 500 on the basis of the arrangement-direction character size determined for each partial area (small area).

The electronic document 500 may be generated in the mode described above.

FIG. 17 illustrates a result of character arrangement according to the fifth embodiment. In FIG. 17, as in FIG. 11, two types of character strings (character strings before and after OCR processing) are displayed overlapping each other.

According to the fifth embodiment, the characters of the OCR processing result are arranged at positions relatively close to the position of the characters displayed as an image in the scanned image 200 in the left-right direction, as illustrated in FIG. 17. For example, as can be seen from the comparison with FIG. 12, which illustrates the result of character arrangement according to the aforementioned comparative example, the character strings of the OCR processing results for the partial areas 231, 232, and 234 (FIG. 16) are arranged at relatively accurate positions in the arrangement direction.

FIG. 18 illustrates a result of character arrangement according to another comparative example. In FIG. 18, as in FIG. 17, two types of character strings (character strings before and after OCR processing) are displayed overlapping each other. FIG. 18 assumes a situation in which an area that includes both of the areas 234 and 235 is determined as a single processing target area (partial area), and the same processing as in the first embodiment is performed on the processing target area. In FIG. 18, characters in the area 235 among a plurality of partial areas are relatively greatly shifted from their original positions due to the influence of a blank area of a relatively great width that exists in the row.

In contrast, in FIG. 17, the character string of the OCR processing result for the partial area 235 (in addition to the character strings of the OCR processing results performed on the partial areas 231, 232, and 234) is arranged at a more accurate position in the arrangement direction. In this way, the influence of a relatively large blank area in a single row of character string can be suppressed or reduced by extracting processing target areas in units of row areas, each corresponding to an area of a single row of character string (in the present example, in units of row areas, each corresponding to an area of a partial range out of the whole range of a single row of character string).

The fifth embodiment describes the example of the case where the aforementioned modification is made to the first embodiment, but the present invention is not limited to this example. The same modification may be made to the second or third embodiment. For example, a case is possible in which an area of a partial range out of the whole range of a single row of character string in the arrangement direction is extracted as a processing target area, and the orthogonal-direction character size is calculated on the basis of the length of the area of the partial range in the orthogonal direction. Then, processing such as determining the arrangement-direction character size of characters in the processing target area is performed on the basis of the calculated orthogonal-direction character size.

6. Variations

While the above has been a description of embodiments of the present invention, the present is not intended to be limited to the examples described above.

For example, the processing for determining the "character width" (step S16) is executed after step S15 in the above-described embodiments, but the present invention is not limited to this example. This determination processing may be executed before step S14 (specifically, in step S13). Alternatively, the determination processing may be started immediately after (or before) the start of the processing of step S14 and executed in parallel with the OCR processing performed by the cloud server 90.

The above-described embodiments take the example of the case where a plurality of partial areas 230 are extracted from the character area 210 of the scanned image 200, and OCR processing is performed for each partial area 230, but the present invention is not limited to this example. For example, the entire character area 210 of the scanned image 200 may be determined as a single processing target area, and OCR processing may be performed on the entire character area 210 as a unit. Then, the result of the OCR processing performed on the entire character area 210 may be transmitted from the cloud server 90 to the external terminal 50, and an electronic document may be generated on the basis of the processing result.

While the above-described embodiments mainly describe the case of horizontally written character strings, the present invention is not limited to this example. The above-described idea is also applicable to vertically written character strings. In the case of vertically written character strings, the arrangement direction of character strings corresponds to the up-down direction (height direction of characters), the "character height" corresponds to the arrangement-direction character size (the size of characters in the arrangement direction), and the "character width" corresponds to the orthogonal-direction character size, as described above.

While the above-described embodiments take the example of the case where partial areas of the scanned image are extracted as processing target areas for OCR processing, the present invention is not limited to this example. For example, the entire area of the scanned image, instead of partial areas of the scanned image, may be extracted (set) as a processing target area for OCR processing.

While the above-described embodiments take the example of the case where the scanned image generated by the MFP 10 is transmitted to the external terminal 50, the external terminal 50 functions as an electric document generation apparatus for generating an electronic document on the basis of the scanned image, and the cloud server 90 functions as an OCR processing apparatus for performing OCR processing, the present invention is not limited to this example.

Figure 19:
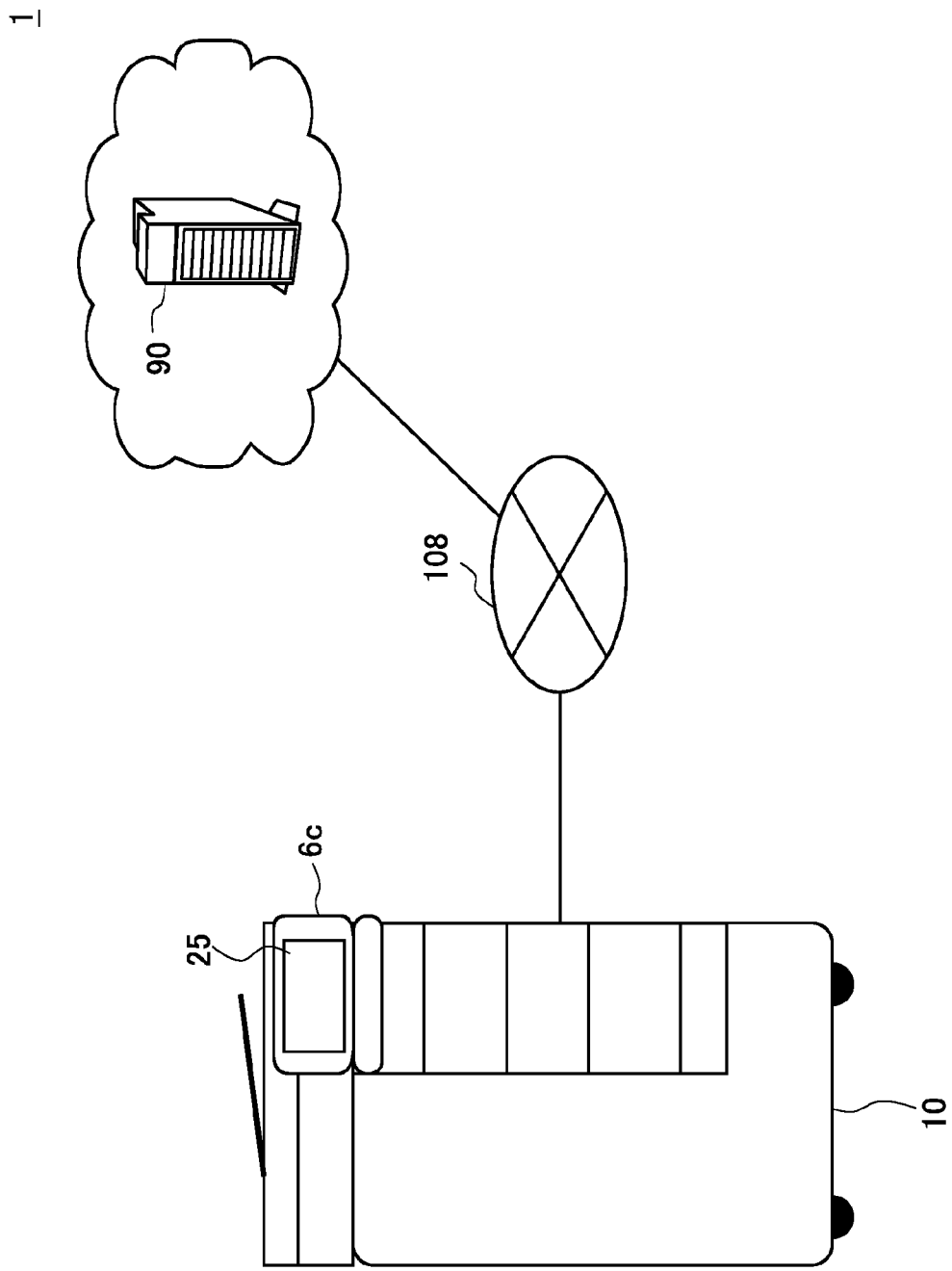
FIG. 19 illustrates a system configuration according to a variation.

For example, a system configuration as illustrated in FIG. 19 is possible in which the MFP 10 itself, which has generated a scanned image, functions as an electric document generation apparatus for executing the same operations as performed by the above-described external terminal 50 (electronic document generation application 110), and the cloud server 90 functions as an OCR processing apparatus for executing OCR processing (general-purpose OCR application 120). To be more specific, the cloud server 90 may execute OCR processing on the scanned image in response to a request from the MFP 10 and transmit the result of the OCR processing to the MFP 10. Then, the MFP 10 may generate an electronic document by arranging the character string of each OCR processing result in the electronic document on the basis of the result of the OCR processing and the arrangement-direction character size (e.g., character width) determined within the MFP 10.

Figure 20:
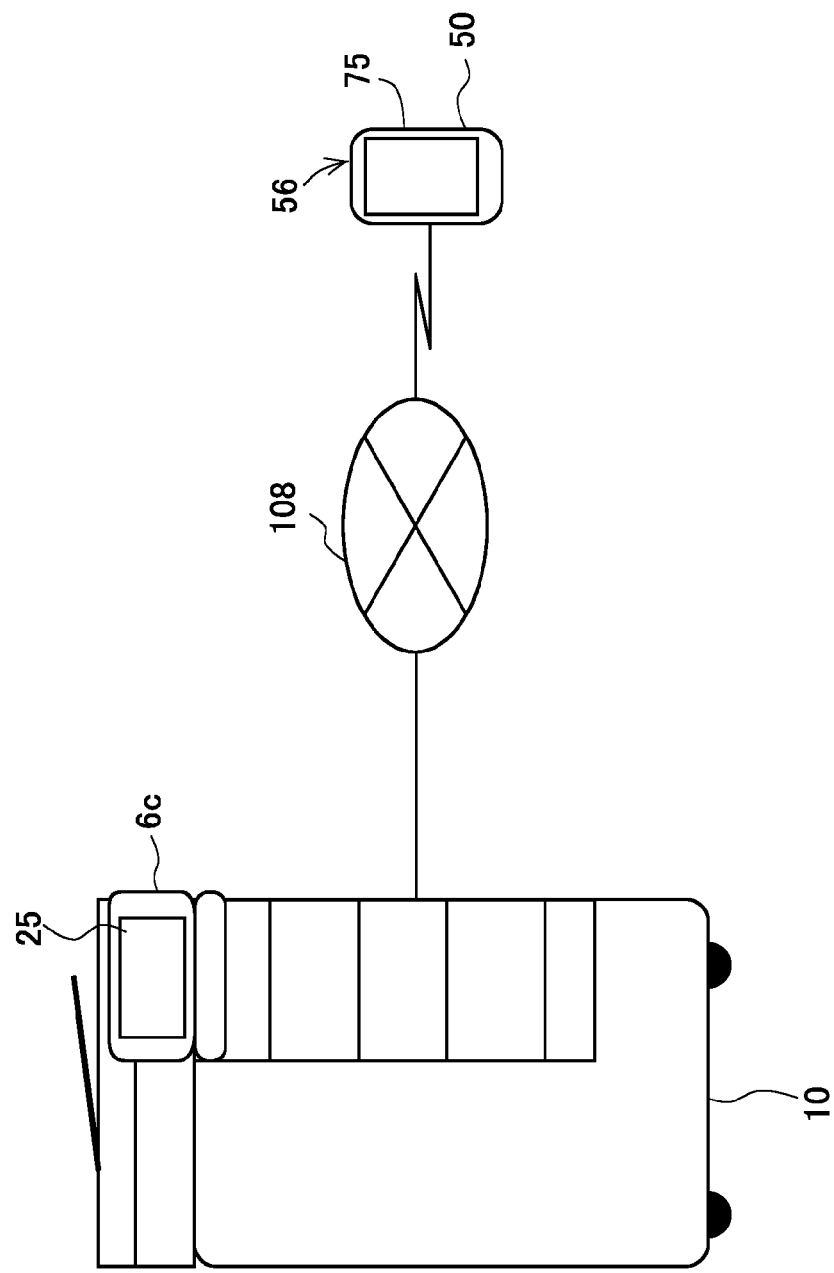
FIG. 20 illustrates a system configuration according to another variation.

A system configuration as illustrated in FIG. 20 is also possible in which the MFP 10 itself, which has generated a scanned image, functions as an electric document generation apparatus for executing the same operations as performed by the external terminal 50 (electronic document generation application 110) in the above embodiments, and the external terminal 50 functions as an OCR processing apparatus for executing the same OCR processing (general-purpose OCR processing application 120) as performed by the above-described cloud server 90. To be more specific, the external terminal 50 may perform OCR processing on the scanned image in response to a request from the MFP 10, and transmit the result of the OCR processing to the MFP 10. Then, the MFP 10 may generate an electronic document by arranging the character string of each OCR processing result in the electronic document on the basis of the result of the OCR processing and the arrangement-direction character size (e.g., character width) determined within the MFP 10.

While in the above-described embodiments, a PDF document with invisible text (a file in a PDF format in which the character string of each OCR processing result is overlaid with and embedded in the original character image without being displayed) (e.g., a searchable PDF document) is generated as the electronic document 500, the present invention is not limited to this example. The electronic document 500 may be generated as follows.

Specifically, the final electronic document 500 may be such that the original character image (image of the character area 210) is deleted, and text data of the OCR processing result is visibly displayed instead of the original character image.

To be more specific, the electronic document 500 may be generated by deleting the image of each partial area 230 of the character area 210 in the scanned image 200 and embedding (arranging) the character string of the result of processing performed on the partial area 230 at the position where the partial area 230 is detected, instead of the image of the partial image 230, while being displayed. That is, the electronic document 500 to be generated may include a text character string, instead of a character image.

While the above-described embodiments take the example of the case of generating an electronic document in a PDF format, the present invention is not limited to this example. For example, the electronic document to be generated may be in other formats (e.g., XPS format).

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. An electronic document generation system comprising:
a first apparatus configured to generate an electronic document on the basis of a scanned image of an original document; and
a second apparatus configured to execute optical character recognition processing on the scanned image upon a request received from the first apparatus and send out a processing result of the optical character recognition processing to the first apparatus,
the first apparatus including:
an extraction unit configured to extract a processing target area from the scanned image, the processing target area including a row area that is an area of a whole or partial range of a row of character string arranged in one direction in the scanned image;
a detection unit configured to detect dimensions of the row area;
a determination unit configured to determine an arrangement-direction character size on the basis of the dimensions of the row area, the arrangement-direction character size being a character size of characters in the processing target area and being a character size in an arrangement direction of the row of character string;

an instruction sending unit configured to send out image data of the processing target area and an instruction to perform the optical character recognition processing on the processing target area to the second apparatus;

a reception unit configured to receive a processing result of the optical character recognition processing performed on the processing target area from the second apparatus; and a generation unit configured to generate the electronic document by arranging a character string of the processing result in the electronic document on the basis of the arrangement-direction character size determined by the determination unit.

2. The electronic document generation system according to claim 1, wherein the determination unit is configured to determine the arrangement-direction character size on the basis of a value obtained by dividing a length of the row area in the arrangement direction by the number of characters in the row area.

3. The electronic document generation system according to claim 2, wherein the extraction unit is configured to extract an area that includes a plurality of rows of character string as the processing target area, and the determination unit is configured to determine the arrangement-direction character size on the basis of a value obtained by dividing a length of the row area in the arrangement direction by the number of characters in the row area, the row area being an area of an arbitrary row of character string among the plurality of rows of character string.

4. The electronic document generation system according to claim 2, wherein the extraction unit is configured to extract an area of a single row of character string as the processing target area, and the determination unit is configured to determine the arrangement-direction character size on the basis of a value obtained by dividing a length of the row area in the arrangement direction by the number of characters in the row area, the row area being the area of the single row of character string.

5. The electronic document generation system according to claim 2, wherein the extraction unit is configured to extract an area of the partial range out of the whole range of the row of character string in the arrangement direction as the processing target area, and the determination unit is configured to determine the arrangement-direction character size on the basis of a value obtained by dividing a length of the area of the partial range in the arrangement direction by the number of characters in the area of the partial range.

6. The electronic document generation system according to claim 1, wherein the determination unit is configured to determine an orthogonal-direction character size on the basis of a length of the row area in an orthogonal direction that is orthogonal to the arrangement direction of the row of character string and determine the arrangement-direction character size on the basis of the orthogonal-direction character size, the orthogonal-direction character size being a character size of characters in the processing target area and being a character size in the orthogonal direction.

7. The electronic document generation system according to claim 6, wherein the extraction unit is configured to extract an area that includes a plurality of rows of character string as the processing target area, and the determination unit is configured to detect the length of the row area in the orthogonal direction on the basis of a length of the processing target area in the orthogonal direction and the number of rows of character string included in the processing target area, determine the orthogonal-direction character size on the basis of the length of the row area in the orthogonal direction, and determine the arrangement-direction character size on the basis of the orthogonal-direction character size.

8. The electronic document generation system according to claim 6, wherein the extraction unit is configured to extract an area of a single row of character string as the processing target area, and the determination unit is configured to calculate the orthogonal-direction character size on the basis of a length of the area of the single row of character string in the orthogonal direction and determine the arrangement-direction character size on the basis of the orthogonal-direction character size.

9. The electronic document generation system according to claim 6, wherein the extraction unit is configured to extract an area of a partial range out of the whole range of the row of character string in the arrangement direction as the processing target area, and the determination unit is configured to calculate the orthogonal-direction character size on the basis of a length of the area of the partial range in the orthogonal direction and determine the arrangement-direction character size on the basis of the orthogonal-direction character size.

10. The electronic document generation system according to claim 1, wherein the determination unit is configured to:

determine the arrangement-direction character size in the processing target area on the basis of a value obtained by dividing a length of the row area in the arrangement direction by the number of characters in the row area; and determine an orthogonal-direction character size on the basis of a length of the row area in an orthogonal direction that is orthogonal to the arrangement direction of the row of character string, the orthogonal-direction character size being a character size of characters in the processing target area and being a character size in the orthogonal direction, and the generation unit is configured to generate the electronic document by arranging a character string of the processing result in the electronic document on the basis of the arrangement-direction character size and the orthogonal-direction character size that have been determined by the determination unit.

11. The electronic document generation system according to claim 1, wherein the detection unit is configured to further detect a position of the processing target area in the scanned image, and the generation unit is configured to further use the position of the processing target area as a basis to arrange the character string of the processing result in the electronic document.

12. The electronic document generation system according to claim 1, wherein
the first apparatus is an image forming apparatus, and
the second apparatus is a cloud server.

13. The electronic document generation system according to claim 1, wherein
the first apparatus is an image forming apparatus, and
the second apparatus is a communication terminal.

14. The electronic document generation system according to claim 1, wherein
the first apparatus is a communication terminal, and
the second apparatus is a cloud server.

15. An electric document generation apparatus for generating an electronic document on the basis of a scanned image of an original document, the apparatus comprising:
an extraction unit configured to extract a processing target area from the scanned image, the processing target area including a row area that is an area of a whole or partial range of a row of character string arranged in one direction in the scanned image;
a detection unit configured to detect dimensions of the row area;
a determination unit configured to determine an arrangement-direction character size on the basis of the dimensions of the row area, the arrangement-direction character size being a character size of characters in the processing target area and being a character size in an arrangement direction of the row of character string;
an instruction sending unit configured to send out image data of the processing target area and an instruction to perform optical character recognition processing on the processing target area to an external apparatus;
a reception unit configured to receive a processing result of the optical character recognition processing executed on the processing target area by the external apparatus, from the external apparatus; and
a generation unit configured to generate the electronic document by arranging a character string of the processing result in the electronic document on the basis of the arrangement-direction character size determined by the determination unit.

16. The electric document generation apparatus according to claim 15, wherein
the determination unit is configured to determine the arrangement-direction character size on the basis of a value obtained by dividing a length of the row area in the arrangement direction by the number of characters in the row area.

17. The electric document generation apparatus according to claim 16, wherein
the extraction unit is configured to extract an area that includes a plurality of rows of character string as the processing target area, and
the determination unit is configured to determine the arrangement-direction character size on the basis of a value obtained by dividing the length of the row area in the arrangement direction by the number of characters in the row area, the row area being an area of an arbitrary row of character string among the plurality of rows of character string.

18. The electric document generation apparatus according to claim 16, wherein the extraction unit is configured to extract an area of a single row of character string as the processing target area, and
the determination unit is configured to determine the arrangement-direction character size on the basis of a value obtained by dividing the length of the row area in the arrangement direction by the number of characters in the row area, the row area being the area of the single row of character string.

19. The electric document generation apparatus according to claim 16, wherein
the extraction unit is configured to extract an area of a partial range out of a whole range of the row of character string in the arrangement direction as the processing target area, and
the determination unit is configured to determine the arrangement-direction character size on the basis of a value obtained by dividing a length of the area of the partial range in the arrangement direction by the number of characters in the area of the partial range.

20. The electric document generation apparatus according to claim 15, wherein
the determination unit is configured to determine an orthogonal-direction character size on the basis of a length of the row area in an orthogonal direction that is orthogonal to the arrangement direction of the row of character string, and determine the arrangement-direction character size on the basis of the orthogonal-direction character size, the orthogonal-direction character size being a character size of characters in the processing target area and being a character size in the orthogonal direction.

21. The electric document generation apparatus according to claim 20, wherein
the extraction unit is configured to extract an area that includes a plurality of rows of character string as the processing target area, and
the determination unit is configured to calculate the length of the row area in the orthogonal direction on the basis of a length of the processing target area in the orthogonal direction and the number of rows of character string included in the processing target area, determine the orthogonal-direction character size on the basis of the length of the row area in the orthogonal direction, and determine the arrangement-direction character size on the basis of the orthogonal-direction character size.

22. The electric document generation apparatus according to claim 20, wherein
the extraction unit is configured to extract an area of a single row of character string as the processing target area, and
the determination unit is configured to calculate the orthogonal-direction character size on the basis of a length of the area of the single row of character string in the orthogonal direction and determine the arrangement-direction character size on the basis of the orthogonal-direction character size.

23. The electric document generation apparatus according to claim 20, wherein
the extraction unit is configured to extract an area of the partial range out of the whole range of the row of character string in the arrangement direction as the processing target area, and
the determination unit is configured to calculate the orthogonal-direction character size on the basis of a length of the area of the partial range in the orthogonal direction and determine the arrangement-direction character size on the basis of the orthogonal-direction character size.

24. The electric document generation apparatus according to claim 15, wherein
the determination unit is configured to:
determine the arrangement-direction character size in the processing target area on the basis of a value obtained by dividing the length of the row area in the arrangement direction by the number of characters in the row area; and
determine an orthogonal-direction character size on the basis of a length of the row area in an orthogonal direction that is orthogonal to the arrangement direction of the row of character string, the orthogonal-direction character size being a character size of characters in the processing target area and being a character size in the orthogonal direction, and
the generation unit is configured to generate the electronic document by arranging a character string of the processing result on the basis of the arrangement-direction character size and the orthogonal-direction character size that have been determined by the determination unit.

25. The electric document generation apparatus according to claim 15, wherein
the detection unit is configured to further detect a position of the processing target area in the scanned image, and
the generation unit is configured to generate the electronic document by further using the position of the processing target area as a basis to arrange the character string of the processing result in the electronic document.

26. The electric document generation apparatus according to claim 15, wherein
the electric document generation apparatus is an image forming apparatus.

27. The electric document generation apparatus according to claim 15, wherein
the electric document generation apparatus is a communication device that is different from an image forming apparatus for generating the scanned image and that is also different from the external apparatus.

28. A non-transitory computer-readable recording medium that stores a program for causing a computer that is built into an electric document generation apparatus for generating an electronic document on the basis of a scanned image of an original document, to execute the steps of:
a) extracting a processing target area from the scanned image, the processing target area including a row area that is an area of a whole or partial range of a row of character string arranged in one direction in the scanned image;
b) detecting dimensions of the row area;
c) determining an arrangement-direction character size on the basis of the dimensions of the row area, the arrangement-direction character size being a character size of characters in the processing target area and being a character size in an arrangement direction of the row of character string;
d) sending out image data of the processing target area and an instruction to perform optical character recognition processing on the processing target area to an external apparatus;
e) receiving a processing result of the optical character recognition processing executed on the processing target area by the external apparatus from the external apparatus; and f) arranging a character string of the processing result in the electronic document on the basis of the arrangement-direction character size determined in the step c).

29. An electric document generation apparatus for generating an electronic document on the basis of a scanned image of an original document, the apparatus comprising:
an extraction unit configured to extract a processing target area that includes a plurality of rows of character string from the scanned image;
a detection unit configured to detect dimensions of the processing target area;
a determination unit configured to determine an arrangement-direction character size on the basis of the dimensions of the processing target area, the arrangement-direction character size being a character size of characters in the processing target area and being a character size in an arrangement direction of the character string in the processing target area;
an instruction sending unit configured to send out image data of the processing target area and an instruction to perform optical character recognition processing on the processing target area to an external apparatus;
a reception unit configured to receive a processing result of the optical character recognition processing executed on the processing target area by the external apparatus from the external apparatus; and
a generation unit configured to generate the electronic document by arranging a character string of the processing result in the electronic document on the basis of the arrangement-direction character size determined by the determination unit,
wherein the determination unit is configured to determine an orthogonal-direction character size on the basis of a length of the processing target area in an orthogonal direction orthogonal to the arrangement direction and the number of rows of character string included in the processing target area, and determine the arrangement-direction character size on the basis of the orthogonal-direction character size, the orthogonal-direction character size being a character size of characters in the processing target area and being a character size in the orthogonal direction.

30. A non-transitory computer-readable recording medium that stores a program for causing a computer that is built into an electric document generation apparatus for generating an electronic document on the basis of a scanned image of an original document, to execute the steps of:
a) extracting a processing target area that includes a plurality of rows of character string from the scanned image;
b) detecting dimensions of the processing target area;
c) determining an arrangement-direction character size on the basis of the dimensions of the processing target area, the arrangement-direction character size being a character size of characters in the processing target area and being a character size in an arrangement direction of the character string in the processing target area;
d) sending out image data of the processing target area and an instruction to perform optical character recognition processing on the processing target area to an external apparatus;
e) receiving a processing result of the optical character recognition processing executed on the processing target area by the external apparatus from the external apparatus; and f) arranging the character string of the processing result in the electronic document on the basis of the arrangement-direction character size determined in the step c), the step c) including the steps of:

c-1) determining an orthogonal-direction character size on the basis of a length of the processing target area in an orthogonal direction orthogonal to the arrangement direction and the number of rows of character string included in the processing target area, the orthogonal-direction character size being a character size of characters in the processing target area and being a character size in the orthogonal direction; and c-2) determining the arrangement-direction character size on the basis of the orthogonal-direction character size.

\* \* \* \* \*